US005668879A

United States Patent [19]

Ibaraki et al.

[11] Patent Number: 5,668,879

[45] Date of Patent: Sep. 16, 1997

[54] AUDIO SCRAMBLING SYSTEM FOR SCRAMBLING AND DESCRAMBLING AUDIO SIGNALS

[75] Inventors: Susumu Ibaraki, Toyonaka; Noboru Katta, Itami; Seiji Nakamura, Toyonaka; Hiroki Murakami, Osaka, all of Japan

[73] Assignee: Matsushita Electric Industrial Co., Ltd., Osaka-fu, Japan

[21] Appl. No.: 619,236

[22] Filed: Mar. 21, 1996

Related U.S. Application Data

[62] Division of Ser. No. 321,766, Oct. 12, 1994, Pat. No. 5,617,476.

[30] Foreign Application Priority Data

| | | | |
|---|---|---|---|
| Oct. 12, 1993 | [JP] | Japan | 5-254183 |
| Dec. 7, 1993 | [JP] | Japan | 5-306386 |
| Dec. 7, 1993 | [JP] | Japan | 5-306387 |

[51] Int. Cl.[6] .......... H04K 1/02; H04K 1/00; H04M 1/68

[52] U.S. Cl. .......... 380/41; 380/49

[58] Field of Search .......... 380/49, 20, 19, 380/9, 10, 41

[56] References Cited

U.S. PATENT DOCUMENTS

| | | | |
|---|---|---|---|
| 4,887,296 | 12/1989 | Horne | 380/21 |
| 4,896,362 | 1/1990 | Veldhuis et al. | 381/30 |
| 4,972,469 | 11/1990 | Saltwick et al. | 380/2 |
| 5,068,895 | 11/1991 | Shimada | 380/28 |
| 5,091,936 | 2/1992 | Katznelson et al. | 380/19 |
| 5,091,941 | 2/1992 | Needle et al. | 380/43 |
| 5,105,463 | 4/1992 | Veldhuis et al. | 381/30 |
| 5,200,823 | 4/1993 | Yoneda et al. | 358/146 |
| 5,214,678 | 5/1993 | Rault et al. | 375/122 |
| 5,243,650 | 9/1993 | Roth et al. | 380/19 |
| 5,303,303 | 4/1994 | White | 380/49 |
| 5,323,396 | 6/1994 | Lokhoff | 370/94.1 |
| 5,375,171 | 12/1994 | Dewolf et al. | 380/49 |
| 5,426,699 | 6/1995 | Wunderlich et al. | 380/20 |
| 5,488,663 | 1/1996 | Dewolf et al. | 380/49 |
| 5,504,934 | 4/1996 | Imai | 455/3.2 |
| 5,511,094 | 4/1996 | Lee et al. | 375/243 |
| 5,530,655 | 6/1996 | Lokhoff et al. | 364/514 A |
| 5,539,829 | 7/1996 | Lokhoff et al. | 381/2 |

FOREIGN PATENT DOCUMENTS

| | | |
|---|---|---|
| 63-031323 | 2/1988 | Japan . |
| 63-087037 | 4/1988 | Japan . |
| 4-068387 | 3/1992 | Japan . |

*Primary Examiner*—Thomas H. Tarcza
*Assistant Examiner*—Hrayr A. Sayadian
*Attorney, Agent, or Firm*—Wenderoth, Lind & Ponack

[57] ABSTRACT

A scrambling system includes a scrambling apparatus and a descrambling apparatus for scrambling and descrambling digital audio codes having plural sub-band units. Each sub-band unit includes at least a scale factor and a quantized sample data which is quantized after scaling with the scale factor. In the scrambling apparatus, a sample period during which the quantized sample data is present is detected, and only the quantized sample data is scrambled at the sample period. In particular, the quantized sample data and data other than the quantized sample data are separated, and the separated quantized sample data is applied to a scrambler, and the other data is applied to a delay circuit. The separated and scrambled quantized sample data and the delayed data are synthesized. The descrambling apparatus also detects a sample period during which the quantized sample data is present, and descrambles only the scrambled quantized sample data at the sample period.

15 Claims, 17 Drawing Sheets

*Fig.5*
| | | | | | | | | | |
|---|---|---|---|---|---|---|---|---|---|
| (−3) | 1 | 0 | 1 | → | 0 | 1 | 1 | (3) |
| (−2) | 1 | 1 | 0 | → | 0 | 1 | 0 | (2) |
| (−1) | 1 | 1 | 1 | → | 0 | 0 | 1 | (1) |
| (0) | 0 | 0 | 0 | → | 0 | 0 | 0 | (0) |
| (1) | 0 | 0 | 1 | → | 1 | 1 | 1 | (−1) |
| (2) | 0 | 1 | 0 | → | 1 | 1 | 0 | (−2) |
| (3) | 0 | 1 | 1 | → | 1 | 0 | 1 | (−3) |
| | 1 | 0 | 0 | → | 1 | 0 | 0 | |
| | SAMPLE DATA | | | | LEVEL INVERTED SAMPLE DATA | | | |
*Fig.6A*
NMSB 611
SAMPLE 61 1 1 1 1 [0] 1 1 0 0 1 0 1 1 0 1 0
MASKING SIGNAL 612 0 0 0 1 1 1 1 1 1 1 1 1 1 1
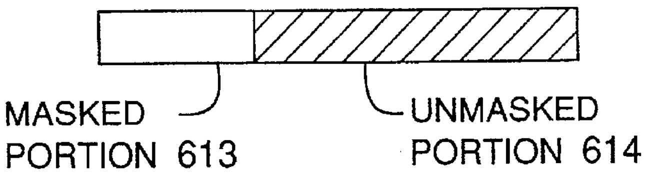
*Fig.6B*
NMSB 621
SAMPLE 62 0 0 0 0 0 0 0 [1] 0 1 1 0 1 1 0 1
MASKING SIGNAL 622 0 0 0 0 0 0 1 1 1 1 1 1 1 1
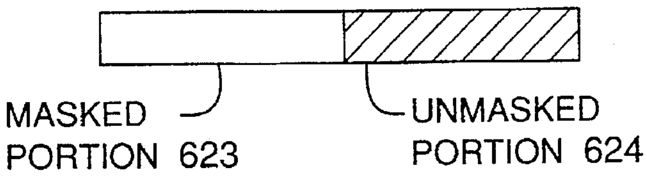

allocation PROCESS S11 sample PROCESS S13 sample PROCESS S13'

AUDIO SCRAMBLING SYSTEM FOR SCRAMBLING AND DESCRAMBLING AUDIO SIGNALS

This is a divisional application of parent application Ser. No. 08/321,766, filed Oct. 12, 1994, now U.S. Pat. No. 5,617,476.

BACKGROUND OF THE INVENTION

1. Field of the invention

The present invention relates to an audio scrambling system for scrambling audio signals on the transmission side for enhanced security, and descrambling the scrambled audio signal on the receiving side. This audio scrambling system may be used for sending and receiving audio signals using wired or wireless communications, or for recording and reproducing audio signals using a storage medium.

2. Description of the prior art

One audio scrambling system according to the prior art is described in U.S. Pat. No. 5,091,941 (filed Oct. 31, 1990, Ser. No. 607,988). This audio scrambling system scrambles the signal by randomizing only the sign bit of each sample in a digital audio signal. The effect of this is to prevent the volume of the audio after scrambling from becoming abnormally high. However, there is only one confidential bit per sample, and the scrambled audio signal can be decoded by unauthorized parties with relative ease.

Another prior-art audio scrambling system is described in Japanese patent laid-open publication number 63-87037. With this audio scrambling system, the transmission side extracts the amplitude data of the audio signal, and scrambles the data only when the amplitude data is less than a predetermined level. The receiving side receives the amplitude data and the scrambled audio, and only descrambles the signal when the amplitude data is less than a predetermined level. This method also prevents the volume of the audio after scrambling from becoming abnormally high. However, because these conventional devices must also transmit amplitude data in addition to the audio data, a separate transmission path is required.

An encryption device used in communications systems which use a specific data pattern as a control code is described in Japanese patent laid-open publication number 4-68387. With this encryption device, a conversion table is compiled and used for encryption. With this conversion table, the control code itself is converted to the same control code, i.e., converted but without any change, and non-control codes are converted to codes other than the control code.

To prevent control errors in communications systems, however, it is necessary to prevent the control code from being converted to another code, and to prevent other codes from being converted to the control code. Control codes of this type are called "reserved codes." The process whereby the reserved code is not converted to another code, and non-reserved codes are not converted to the reserved code, is known as "reserved code management." Conventional encryption devices combine the encryption process with reserved code management, and can thereby prevent control errors in communications systems.

With this conventional encryption system, however, time is required to pre-compile the conversion table, and a storage means is required to store the conversion table, thus increasing both the scale of the device and the required processing time. In addition, the encryption process can only be executed based on a conversion table.

SUMMARY OF THE INVENTION

Therefore, the first object of the present invention is to provide an audio scrambling system for processing any pulse-code modulation (PCM) digital audio signal without needing to transfer non-audio data, with relatively high security, and without producing a scrambled audio signal that is unpleasant to the listener's ear.

A second object of the invention is to provide an audio scrambling system for encrypting data comprising plural codes, one of which is a reserved code, and which can execute reserved code management; can be achieved by a simple hardware configuration; and can use any desired encryption method.

A third object of the invention is to provide an audio scrambling system for a scrambling digital audio code comprising plural sub-band units, each sub-band unit comprising scale factor information and a quantized sample data quantized after scaling with the scale factor; and which does not result in a scrambled audio signal that is unpleasant to the listener's ear.

According to the first embodiment of the invention, in a scrambling system comprising a scrambling apparatus and a descrambling apparatus for scrambling and descrambling a digital audio signal having a plurality of sample data units, each unit having a predetermined bit length, the scrambling apparatus comprises: first detection means for detecting a first portion and a second portion in each sample data unit; and encryption means for encrypting said sample data unit only at said second portion, and for producing a scrambled sample data unit; and the descrambling apparatus comprises: second detection means for detecting said first portion and said second portion in each scrambled sample data unit; and decryption means for decrypting said scrambled sample data unit only at said second portion, and for producing a descrambled sample data unit.

According to a preferred embodiment, the first portion and the second portion is separated by a next-most-significant bit which is the highest order bit with a value which is not equal to that of a most-significant bit in said sample data unit, and said next-most-significant belonging to said first portion.

When the audio signal is scrambled by this system, the position of the next-most-significant bit (NMSB) in the sample data is not changed by the encryption process. The position of the NMSB regulates the volume of the sample data. Therefore, when the scrambled audio signal is reproduced, the audio volume is not abnormally high, and audio scrambling that is not unpleasant to the listener's ear can be achieved.

Because the location of the encrypted bits can be detected from the location of the NMSB, the signal can also be correctly decrypted.

According to preferred embodiment of the invention, the scrambling apparatus (12) further comprises: memory means (224) for storing a reserved code; comparator means (222) for comparing a predetermined portion of said sample data unit with the same predetermined portion of said reserved code, and for producing a permit signal when said comparison result is a mismatch, and an inhibit signal when said comparison result is a match; and said encryption means being disabled by said inhibit signal and being enabled by said permit signal.

When the data at the comparison position of the sample data and the reserved code matches, the sample data is not encrypted or decrypted, and the reserved code is not converted to another sample data code and non-reserved code sample data is not converted to a reserved code as a result of the encryption/decryption process. Furthermore, when the data at the comparison position of the sample data and the reserved code does not match, only the data outside the sample data comparison position is encrypted/decrypted, and the data at the comparison position is not processed. As a result, the sample data is not converted to a reserved code. Reserved code management is therefore also possible when data comprising plural sample data including reserved codes is processed. The encryption/decryption process of the scrambling system according to the second embodiment only limits the code position that is processed, and does not limit the encryption/decryption method itself; any desired encryption/decryption method can therefore be used.

According to another preferred embodiment of the present invention, in a scrambling system comprising a scrambling apparatus and a descrambling apparatus for scrambling and descrambling digital audio codes having a plurality of sub-band units, each sub-band unit comprising at least a scale factor and a quantized sample data quantized after scaling with the scale factor, the scrambling apparatus comprises: first detection means for detecting a sample period during which said quantized sample data is present; and scrambling means for scrambling said quantized sample data only at said sample period; and the descrambling apparatus comprises: second detection means for detecting a sample period during which said quantized sample data is present; and descrambling means for descrambling said scrambled quantized sample data only at said sample period.

By the above embodiment, only the quantized sample data of each sub-band data is scrambled, and the scale factor information is not scrambled. As a result, the audio content of the sub-band data is concealed because the quantized sample data is randomized, but the volume of the sub-band data does not become abnormally high because the scale factor information is retained. Therefore, an abnormal frequency component is not produced, and an amplitude component that overall is abnormally high does not result. It is therefore possible to easily achieve an audio scrambling system that does not result in an audio signal unpleasant to the listener's ear.

BRIEF DESCRIPTION OF THE DRAWINGS

The present invention will become more fully understood from the detailed description given below and the accompanying diagrams wherein:

FIG. 5 is diagram showing simple examples of data change in a level invertor shown in FIG. 2;

FIGS. 6A and 6B are diagrams showing examples of sample data and masking signal;

DESCRIPTION OF PREFERRED EMBODIMENTS

FIRST EMBODIMENT

Figure 1:
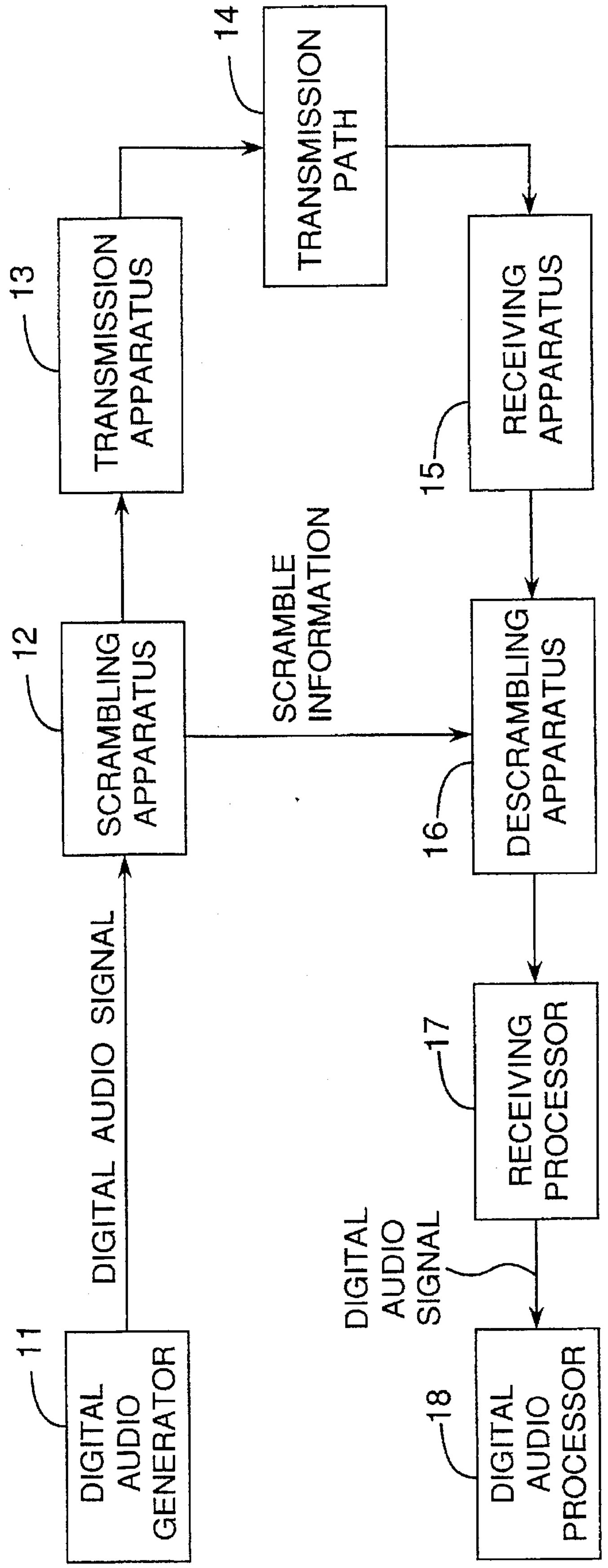
FIG. 1 is a block diagram of a scrambling system according to the first embodiment of the invention.

Referring to FIG. 1 an audio scrambling system according to the first embodiment comprises a digital audio generator 11, scrambling apparatus 12, transmission apparatus 13, transmission path 14, receiving apparatus 15, descrambling apparatus 16, receiving processor 17, and digital audio processor 18. The operation of the audio scrambling system of the first embodiment thus comprised is described below.

The digital audio generator 11 first generates a digital audio signal from plural sample data. The actual generating device may be any type of device outputting a digital audio signal, including an analog/digital converter that outputs a digital audio signal from an analog audio signal obtained using a microphone or by reproducing a recording from an analog tape recorder; a device of reproducing a digital audio signal from a digital tape recorder or compact disc; or a computerized sound generator.

The sample data is two's complement binary data sampled at a predetermined sampling rate and quantized at 'n' bits; 'n' is normally a value between 8–32, but the invention shall not be so limited and the value of 'n' may be any specific finite number. In the description below the value of 'n' is assumed to be a fairly typical value of n=16. The dynamic range may also be any range expressed with 'n' bits. In the following description, the dynamic range assuming a value of n=16 is in the range 0x8001 to 0x7fff where the 0x prefix denotes hexadecimal notation. The predetermined-sampling rate may be 32 kHz, 44.1 kHz, 48 kHz, or other finite value, but is usually within the range 8 kHz–96 kHz.

The scrambling apparatus 12 then scrambles the digital audio signal. The specific operation of the scrambling apparatus 12 is described in greater detail below.

The output from the scrambling apparatus 12 is passed by the transmission apparatus 13 over the transmission path 14, and is received by the receiving apparatus 15. The transmission path 14 may be a wired path such as fiber-optic cable, coaxial cable, or telephone wire, or may be a wireless path. The transmission path 14 can also be a physical storage media such as magnetic tape, magnetic disk, magneto-optical disk, compact disc, RAM or other medium.

After the transmission apparatus 13 adds the error correction code to the digital audio signal, it converts the signal to a format suited to the transmission path 14 and transmits the signal. The receiving apparatus 15 receives the transmitted data, reproduces the digital audio data, performs error correction processing, and substitutes 0x8000 for the error sample data that cannot be error corrected.

The descrambling apparatus 16 then descrambles the digital audio signal. This descrambling apparatus 16 essentially reverses the scrambling process applied by the scrambling apparatus 12. The specific operation is described in greater detail later.

Next, the receiving processor 17 applies error interpolation processing substituting each 0x8000 code in the sample data with the average value of the sample data before and after the 0x8000 code. Note that the 0x8000 code is used as a control code identifying the sample data containing an uncorrectable error between the receiving apparatus 15 and receiving processor 17. However, any code can be selected as the control code outside the dynamic range of the signal. The control code can also be used for other purposes, including synchronization, between the transmission apparatus 13 and receiving apparatus 15, the transmission apparatus 13 and receiving processor 17, or between any other components.

If, however, this 0x8000 control code is converted to some other code by the descrambling apparatus 16, error interpolation processing cannot be correctly executed by the receiving processor 17. Similarly, if some other code is converted to the 0x8000 code, error interpolation processing will be applied to no-error sample data. More specifically, the 0x8000 code is the reserved code described above in the prior art, and it is therefore necessary for reserved code management processing defining the 0x8000 code as a reserved code to be applied in the descrambling apparatus 16. Because the descrambling apparatus 16 basically reverses the conversion process of the scrambling apparatus 12, the scrambling apparatus 12 must also apply the same reserved code management process. This need for reserved code management also applies to all control codes used for other purposes and between other system components.

Finally, the digital audio processor 18 executes the final target process, including reproduction or recording, on the digital audio signal. As a result, the digital audio processor 18 may be constructed to digital-analog (D/A) convert the digital audio signal for reproduction through speakers; to D/A convert the signal for recording by an analog tape recorder; or to directly record the digital audio signal to a digital audio tape recorder, magnetic disk, or other digital storage medium.

In FIG. 1, scramble information is shown as applied directly from the scrambling apparatus 12 to descrambling apparatus 16, but can be applied through transmission apparatus 13, transmission path 14 and receiving apparatus 15, together with other data.

Figure 2:
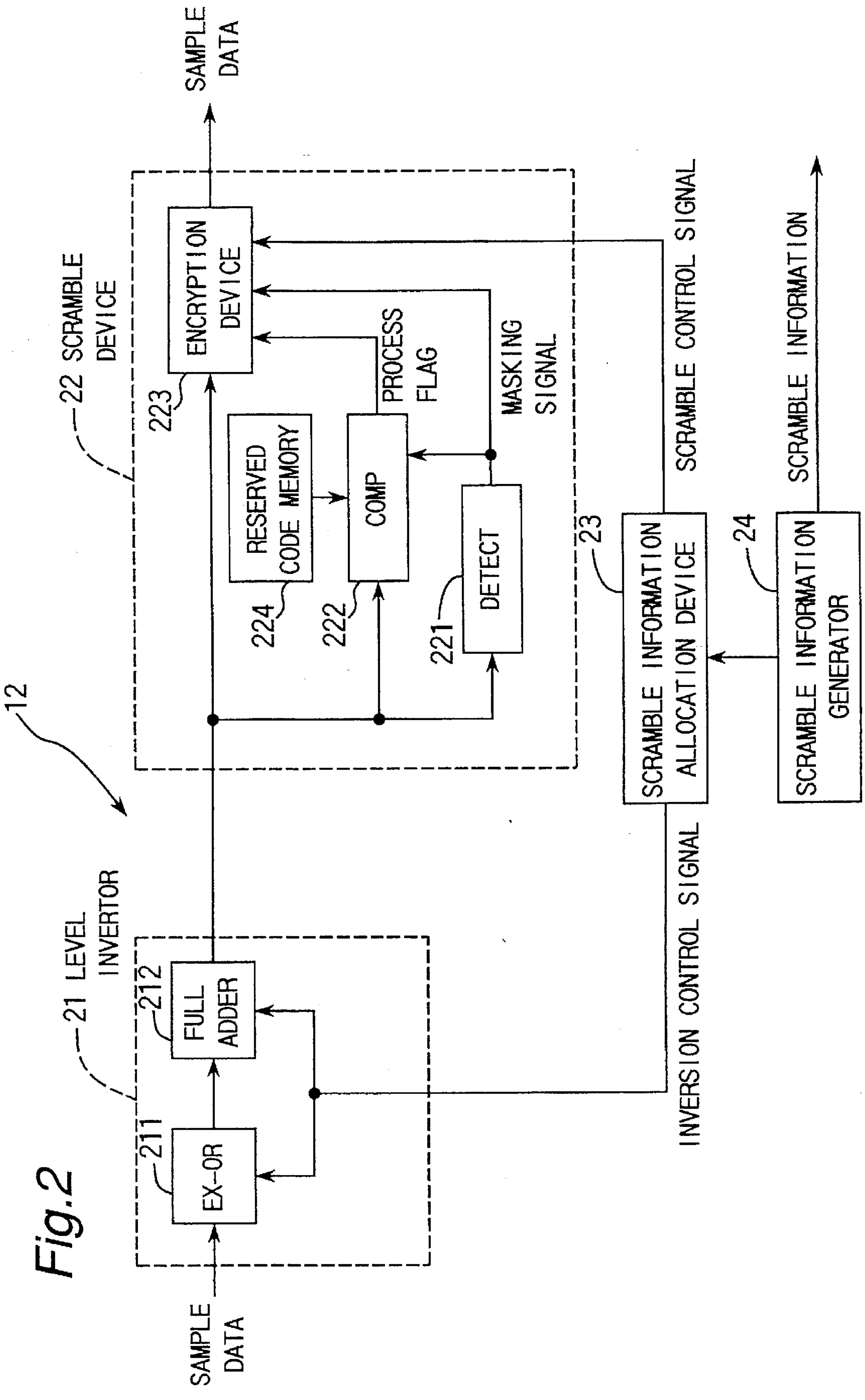
FIG. 2 is a block diagram showing a detail of a scrambling apparatus shown in FIG. 1.

Referring to FIG. 2, a detail of the scrambling apparatus 12 is shown. This scrambling apparatus 12 comprises an level invertor 21, a scramble device 22, and a scramble information allocation device 23. The level invertor 21 comprises an exclusive-OR 211 and a full adder 212. The scramble device 22 comprises a detector 221, comparator 222, and an encryption device 223.

The inputs to this scrambling apparatus 12 are a digital audio signal comprising plural 16-bit sample data, and scramble information comprising sets of 15-bit random numbers corresponding to each sample data. The scrambling apparatus 12 processes each sample data of the input data. Note that the following description of scrambling apparatus operation refers to the process applied to one sample data. This operation is therefore repeated as required to process all sample data units comprising the digital audio signal.

The 15-bit random number of the scramble information is first input to the scramble information allocation device 23, which splits the 15-bit random number to obtain and output a 1-bit random number as the inversion control signal and a 14-bit random number as the scramble control signal. The 16-bit sample of the input audio data is also processed by the level invertor 21, and then by the scramble device 22. Note that the inversion control signal and the scramble control signal are respectively input to the level invertor 21 and to the scramble device 22 to control the respective processes. These processes are described in further detail below.

Operation of the level invertor 21 is described first.

The inputs to the level invertor 21 are the audio data and the inversion control signal.

The exclusive-OR 211 first applies an exclusive-OR operation on each bit of the input audio signal sample data using the inversion control signal corresponding to that sample data, and outputs the results. As shown in Table 1 below, the output of the exclusive-OR 211 is the same as the input (sample data) when the inversion control signal is "0", but is inverted when the inversion control signal is "1".

TABLE 1

| Inversion control signal | Sample data | Output of EX-OR |
|---|---|---|
| 0 | 0 | 0 |
| 0 | 1 | 1 |
| 1 | 0 | 1 |
| 1 | 1 | 0 |

The full adder 212 then adds the sample data output from the exclusive-OR 211 and the inversion control signal corresponding to that sample data. The 16-bit data after being added with the one bit inversion control signal may result in overflow to produce a seventeenth bit, but the overflown seventeenth bit data will be ignored.

To describe the operation of the level invertor 21, an example of the process inverting the sample data values is shown in FIG. 5. FIG. 5 shows sample data, each is 3-bit long and expressed by two's complement binary. The dynamic range in this example ranges from 101 (−3 in decimal) to 011 (3 in decimal). It is noted that the most-significant bit is used for expressing plus sign when it is "0", and minus sign when it is "1". In this inversion process, the median value of the dynamic range, i.e., the median between the maximum and minimum sample data values, is selected as the reference value against which each sample data value is folded. Because 000 is the median of the dynamic range in this example, the inversion process is referenced to 000. This is also true of the 16-bit coded two's complement binary code used in this embodiment.

It is to be noted that the level invertor 21 may be configured in any way achieving an inversion process similar to that shown in FIG. 5, and shall not be limited to the configuration shown in FIG. 2. For example, a ROM (read-only memory) storing the inversion results as the outputs from each address may be used.

By the process executed by the level invertor 21 of this embodiment, the result of inverting the sample data is output when the input inversion control signal is 1, and the input sample data is output without processing when the inversion control signal is 0. In other words, only the sample data specified by the inversion control signal is inverted from 0x0000, the median value of the dynamic range. Because audio sample data has a sign (positive or negative), the inverted sample data simply has the signs inverted, and the absolute value of the amplitude does not change. In addition, reserved code management relating to the reserved code 0x8000 can also be achieved.

As a result, the data processed by the level invertor 21 does not end up with an abnormally high volume level, and reserved code management using 0x8000 as the reserved code can be applied. This effect can also be achieved when the scrambling apparatus 12 consists solely of an level invertor 21.

A specific example of a 16-bit data is given below.

| | |
|---|---|
| (a) EX-OR 211 input: | 1111 0110 0101 1010 |
| (b) Inversion control signal: | 1 |
| (c) Ex-OR 211 output: | 0000 1001 1010 0101 |
| (d) Adder 212 output: | 0000 1001 1010 0110 |
| (e) EX-OR 211 input: | 1111 0110 0101 1010 |
| (f) Inversion control signal: | 0 |
| (g) Ex-OR 211 output: | 1111 0110 0101 1010 |
| (h) Adder 212 output: | 1111 0110 0101 1010 |

Items (a), (b), (c) and (d) show a case when the inversion control signal is "1", and items (e), (f), (g) and (h) show a case when the inversion control signal is "0". Adder 212 adds the inversion control signal and the exclusive-OR 211 output. Thus, items (c) and (d) differs only at the last two bits. As apparent to those skilled in the art, the signals at items (a) and (d) are two's complement binary.

Operation of the scramble device 22 is described next.

The inputs to the scramble device 22 are the sample data from the level invertor 21, and the 14-bit scramble control signal corresponding to the sample data.

Before proceeding with the description of operation, the next-most-significant bit must first be defined. This "next-most-significant bit" refers to the highest order bit having a symbol differing from that of the most-significant bit. When the most-significant bit (MSB) value is [0], then the next-most-significant bit (NMSB) is the highest order bit with a value of [1] in the same sample data. For example, when the sample data is [0000 1011], which is equal to an amount "11" in the decimal system, it is noted that the first four zeros from the left do not positively participate in defining the number, but are there to merely fill in the places. Thus, the left four bits are referred to as meaningless bits and the right four bits are referred to as meaningful bits. It can be said that the next-most-significant bit is the most-significant bit in the meaningful bits, and in the above example, it is the fifth bit from the left.

In the above example [0000 1011], if, after the scrambling process, any one or more of the four zeros from the left should turned to "1", then, the sample data would be increased greatly, resulting in abrupt loud sound. For example, if the received and scrambled signal should turn out to be [0100 1011], then, the amount "11" would be erroneously increased to "11+64", resulting in unexpected loud sound which is unpleasant to the listener's ear.

One feature of the present invention is to prevent scrambling operation and eventually descrambling operation of the meaningless bits. For detecting the meaningless bits and meaningful bits, the present invention has a detector 221 for detecting the next-most-significant bit. According to the preferred embodiment of the present invention, not only the meaningless bits, but also the most-significant bit in the meaningful bits, which is called the next-most-significant bit, is also prevented from being scrambled and descrambled. Thus, according to the present invention, the detector 221 produces a masking signal, as shown in FIG. 6B, in which the portion corresponding to the meaningless bits plus the next-most-significant bit is aligned with Os for masking purpose, and the remaining portion is aligned with is for unmasking purpose that is for being subject to receive scrambling. In FIG. 6B, the first two bits from the left are not provided in the masking signal, because these two bits are always the bits which should not be scrambled and should always be masked.

When the MSB is [1], the NMSB is the highest order bit with a value of [0] in the same sample data. In detector 221, the MSB is sequentially compared with each of the subsequent bits until the least-significant bit (LSB), and the first bit having a value different from that of the MSB is defined as the NMSB. Thus, in another 8-bit sample data [1111 0101] where the MSB is the first (left-most) bit with "1", the NMSB is the fifth from left bit. Because the closer the NMSB is to the MSB, the higher the sound level of the sample data, the NMSB may be said to control the sound level of the sample data.

The detector 221 first detects the NMSB of the 16-bit sample data, generates a 14-bit masking signal wherein all lower-order bits than the detected NMSB are 1 for unmasking purpose, and all other bits are 0 for masking purpose, and then outputs the 14-bit masking signal. The format of the masking signal shall not be so limited, however, and can be any format wherein at least the NMSB and all higher order bits have a value of 0 for masking purpose.

The masking signal is output from the detector 221 and input to the comparator 222 which also receives data from full adder 212. The comparator 222 compares the 16-bit reserved code (such as control code) and the 16-bit sample data, only at the masked portion, that is the two highest bits and the 0-value bit position of the masking signal. If all of the compared bits in the masked portion match, comparator 222 generates a process flag "0", indicating that the sample data resembles the reserved code so that scrambling should not be carried out with respect to the detected sample data. If the compared bits do not match, comparator 222 generates a process flag "1", indicating that the scrambling can be effected with respect to the detected sample data.

The comparator 222 may store the reserved code(s) internally, or the reserved code(s) may be input from an external source, such as a reserved code memory 224 shown in FIG. 2.

The audio signal, scramble control signal, masking signal output from the detector 221, and the process flag output from the comparator 222 are all input to the encryption device 223.

Figure 3:
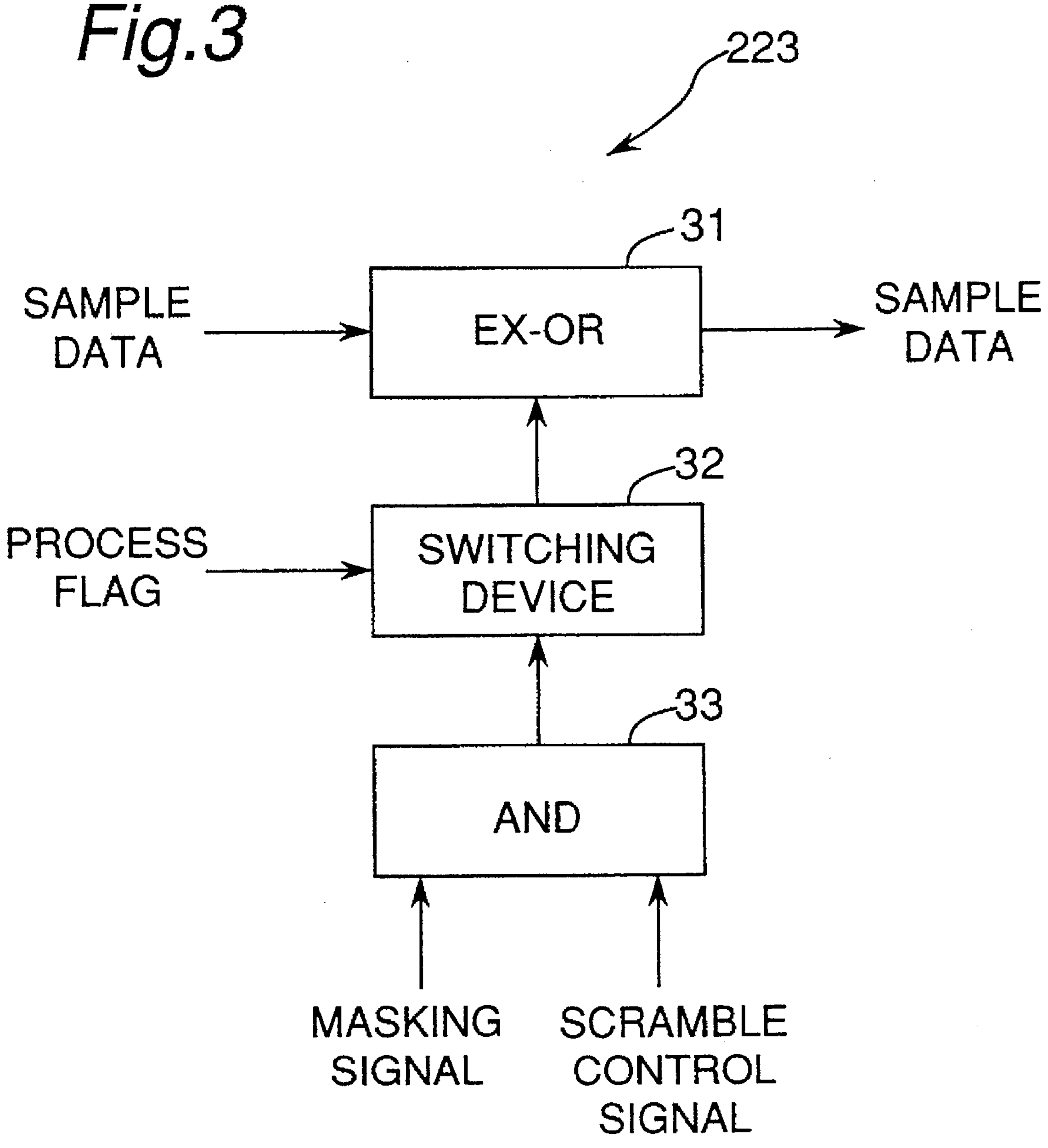
FIG. 3 is a block diagram showing a detail of an encryption device shown in FIG. 2.

The structure of the encryption device 223 is shown in FIG. 3. As shown in FIG. 3, the encryption device 223 comprises an exclusive-OR processor 31, a switching device 32, and an AND element 33.

The masking signal and scramble control signal are input to the AND element 33, which performs a logical AND operation on the inputs and outputs the result. Thus, only the scramble control signal in the unmasked portion can path through AND element 33. If the process flag is '1', the switching device 32 is enabled to directly output the input from the AND element 33. If the process flag is '0', switch device 32 is disabled to cut off the data from the AND element 33, and instead produces a 14-bit '0' code. The exclusive-OR processor 31 then applies an exclusive-0R operation to the lowest fourteen bits of the sample data in accordance with the 14-bit output from the switching device 32, and outputs a 16-bit word of which the two highest bits are the two highest bits of the sample data, and the lowest fourteen bits are the 14-bit exclusive-OR result. Thus, the sample data is scrambled.

A specific example of a 16-bit data is given below.

| | |
|---|---|
| (i) Detector 221 input: | 1111 0110 0101 1010 |
| (j) Masking signal: | 00 0111 1111 1111 |
| (k) Reserved code from 224: | 1000 0000 0000 0000 |
| (l) Process flag: | 1 |
| (m) Scramble control signal: | 10 1011 1011 1110 |
| (n) AND 33 output: | 00 0011 1011 1110 |
| (o) SW 32 output: | 00 0011 1011 1110 |
| (p) EX-OR 223 output: | 1111 0101 1110 0100 |

The same signal as the signal in Item (h) is used in Item (i). The reserved code in Item (k) and the scramble control signal in item (m) are selected merely as examples. The process flag is "1" because the input signal in Item (i) and the reserved code in item (k) do not match at the first upper five bits, i.e., the bits in the masked portion. Thus, it is understood that the input signal is not the reserved code, at all. AND element 33 outputs scramble control signal only in the unmasked portion, that is the lower eleven bits. Thus, the exclusive-OR operation by the exclusive-OR processor 31 is done only with respect to the lower eleven bits of the sample data.

Note also that the encryption device 223 is not limited to the construction shown in FIG. 3. Any configuration using a DES, RSA, or other encryption method may be used insofar as the sample data at the '1' position of the masking signal is randomized or scrambled when the process flag is '1'.

The process executed by the scramble device 22 described above is described below with reference to FIGS. 6A and 6B, which illustrate the process executed by the detector 221 of the scramble device 22 of the scrambling apparatus 12 of this first embodiment. Shown in FIGS. 6A and 6B are the sample data 61 and 62; next-most-significant bits 611 and 621; masking signals 612 and 622; masked portion 613 and 623; and unmasked portion 614 and 624. It is noted that the sample data 61 in FIG. 6A is the same as that shown in Item (i) above.

When the sample data 61 is input to the detector 221, the NMSB 611, which is the highest order '0' bit in the sample data because the MSB is '1', is detected. Next, a masking signal of which all bits lower than the NMSB 611 are '1', i.e., the eleven bits to the right of the NMSB 611 in FIG. 6A, is output. The encryption device 223 later adds a random number only to those bits with a value of '1' in this masking signal. The bits to which the random number is added are shown in unmasked portion 614. As shown in FIG. 6B, the same process is executed for sample 62, as well as for the other sample data.

The position of the NMSB in the sample data is therefore not changed by the randomization process applied by the detector 221 and encryption device 223. Because this NMSB controls the level of the sample data, no data change in any of the bits will take place in the masked portion during the scrambling. Thus, the volume of the sound will not become abnormally high when the processed audio signal is reproduced, and audio scrambling that does not result in an extremely unpleasant sound when reproduced can be achieved. Because in some modification, the position of the next-most-significant bit may be unchanged, it is also not necessary to transmit secondary data identifying the processed position, for example. In addition, this result can be achieved without the comparator 222 and the switching device 32 of the encryption device 223.

Figure 7:
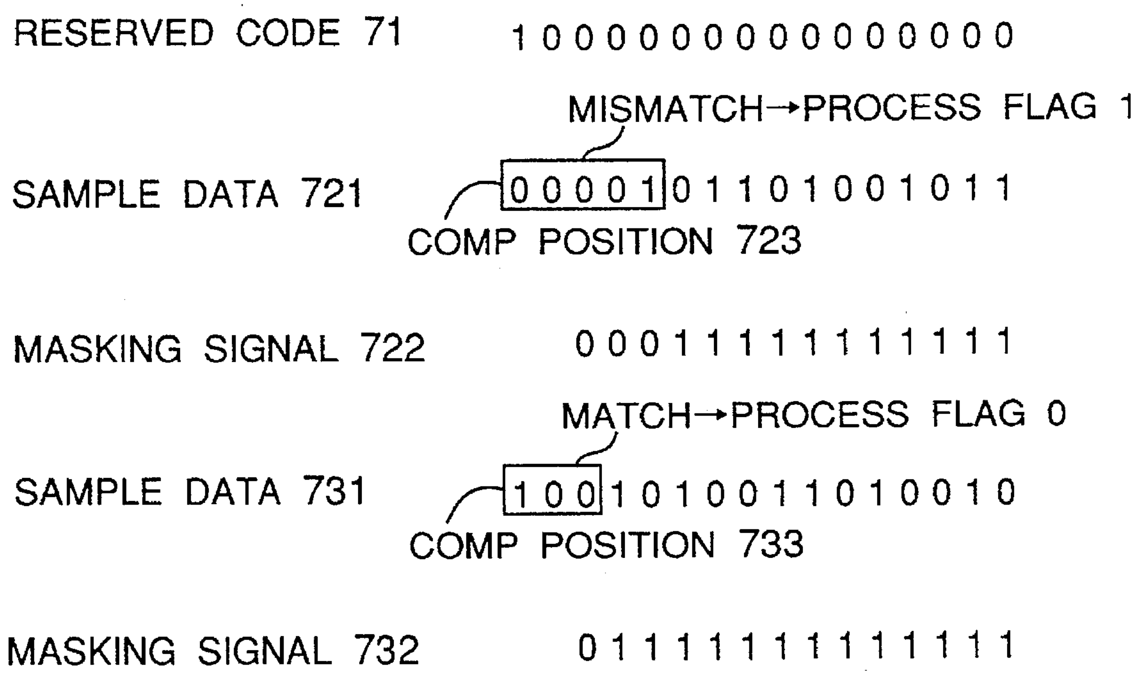
FIG. 7 show diagrams of samples of reserved code, sample data and masking signal.

FIG. 7 also shows the process executed by the comparator 222 of the scramble device 22 of the scrambling apparatus 12 according to the first embodiment. Shown in FIG. 7 are the reserved code 71; sample data 721 and 731; masking signals 722 and 732; and comparison positions 723 and 733.

When the sample data 721 and the corresponding masking signal 722 are input, the comparator 222 compares the upper two bits and the bit positions where the masking signal is '0' in the sample data 721 and reserved code 71. In this example, the comparator compares the five high bits at comparison position 723. Because there is a mismatch in this case, the process flag is output with a value of "1", and the encryption device 223 thus adds a random number to the low eleven bits of sample data 721.

When the sample data 731 and the corresponding masking signal 732 are input, the comparator 222 compares the sample data 731 of the position where the masking signal is '0' with the reserved code 71. In this example, the comparison compares the three high bits at comparison position 733. Because there is a match in this case, the process flag is output with a value of '0', and the encryption device 223 does not add a random number to the sample data 731.

By this process by the comparator 222 and the encryption device 223, sample data of which the bits at the comparison position match the reserved code 71 is not processed, the reserved code 71 is therefore not converted to another code, and other codes are not converted to the reserved code 71. Sample data of which the bits at the comparison position do not match the reserved code 71 are processed, but only the bits not in the comparison position are processed. As a result, the sample data and the reserved code remain different even after processing is completed, and the sample data is not converted to the reserved code.

Moreover, the reserved code outside the dynamic range, and codes of which several bits from the MSB side are equal, are codes near the end of the dynamic range, and the frequency of these codes appearing is extremely low due to the characteristics of the digital audio signal. For example, the probability of the high four bits of the sample data matching the high four bits of the 0x8000 code is small. As a result, virtually all codes can, in practice, be encrypted, and safety (security) is not greatly impaired.

It is to be noted that the reserved code is described as 0x8000 in this example, but shall not be so limited. When the reserved code differs from 0x8000, the comparator 222 is structured to similarly compare the selected reserved code with the sample data. As a result, reserved code management can be achieved with any selected reserved code.

Furthermore, while only one reserved code has been used in the above description, the invention shall not be so limited. When plural reserved codes are used, all reserved codes are compared with the sample data. The process flag is set to '0' in this case if there is a match with any one of the reserved codes, and is set to '1' when no reserved codes match. This makes it possible to maintain reserved code management when plural reserved codes are used.

In addition, the above processes have been described as applied to audio signals of plural sample data, but the invention shall not be so limited, and can be applied to any type of digital data comprising plural equal-length code words while still maintaining reserved code management.

By the scramble device 22 thus described, an abnormally high sound level does not result after processing, sufficient security can be maintained, and reserved code management of any reserved code can be applied in the scrambling process.

The level invertor 21 and scramble device 22 are connected for processing in the scrambling apparatus 12 of this embodiment, thus achieving a scrambling apparatus whereby an abnormally high sound level does not result after processing, reserved code management of any reserved code can be applied, and security can be enhanced by further combination of any appropriate apparatus.

Figure 4A:
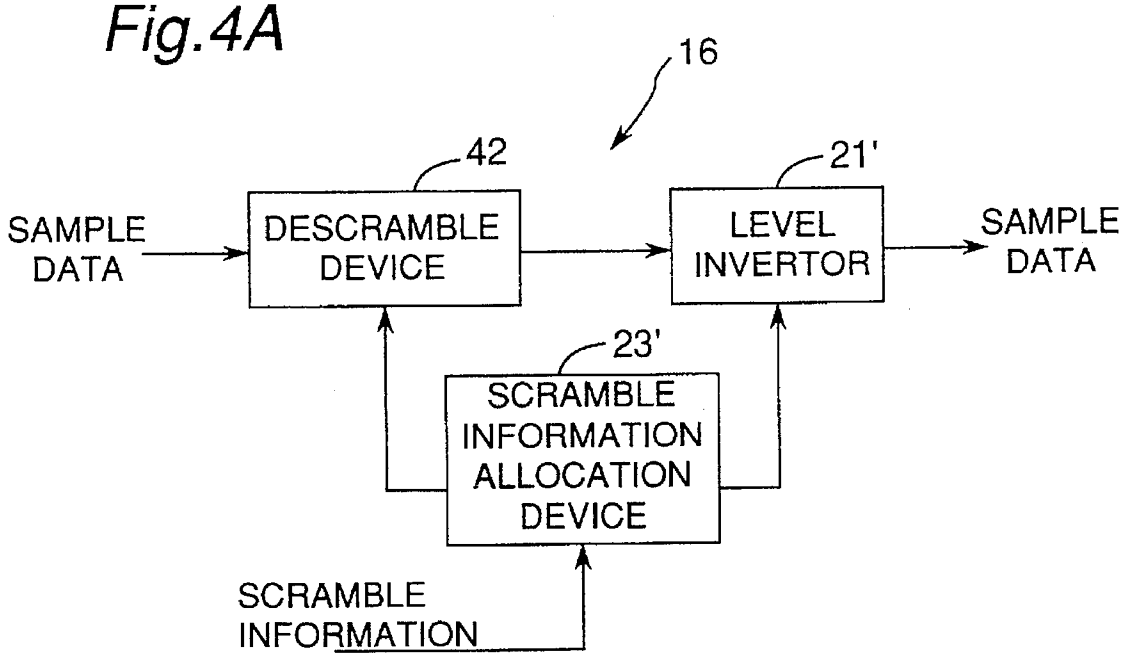
FIG. 4A is a block diagram showing a detail of a descrambling apparatus shown in FIG. 1.

The operation of the descrambling apparatus 16 of this embodiment is described next. FIG. 4A is a block diagram of this descrambling apparatus 16.

As shown in FIG. 4A, the descrambling apparatus 16 comprises a level invertor 21', scramble information allocation device 23', and descrambling device 42. Note that the level invertor 21' and scramble information allocation device 23' shown here operate identically to the level invertor 21 and scramble information allocation device 23 shown in FIG. 2.

Figure 4B:
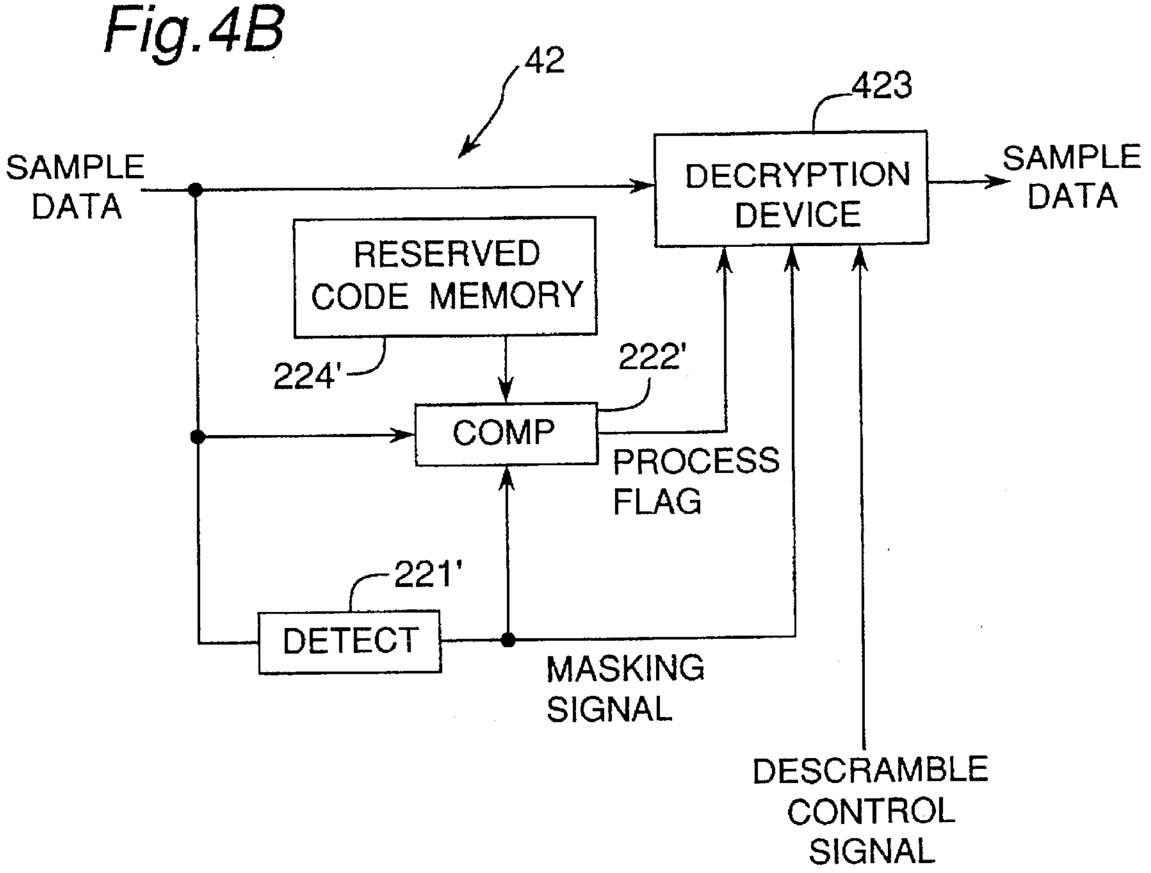
FIG. 4B is a block diagram showing a detail of a descramble device shown in FIG. 4A.

FIG. 4B is a block diagram of the de-randomizing device 42, comprising a detector 221', comparator 222', and decryption device 423. Note also that the detector 221' and comparator 222' operate identically to the detector 221 and comparator 222 shown in FIG. 3. In addition, note that the decryption device 423 performs the inverse of the encryption applied by the encryption device 223. The decryption device 423 for the encryption device 223 shown in FIG. 3 can be achieved by exactly the same operation and configuration as the encryption device 223.

As shown above, the same part of the data scrambled by the scrambling apparatus 12 is inversely converted by the descrambling apparatus shown in FIGS. 4A and 4B, and the data can therefore be correctly decoded.

By the present embodiment described above, a scrambling system can be provided whereby an abnormally high sound level does not result when scrambled audio information is reproduced; the security of the scrambled audio information can be sufficiently assured; and reserved code management of any desired reserved codes can be achieved.

It should be noted that while the first embodiment above has the scramble device 22 provided after the level invertor 21 in the scrambling apparatus 12, and the level invertor 21' is provided after the descramble device 42 in the descrambling apparatus 16, the invention shall not be so limited, and the same effect can be obtained by reversing this order. In addition, it is possible to provide only one of these components and still obtain the same effect while simplifying the circuit construction.

Furthermore, the embodiment comprises a comparator 222 and switching device 32 in both of the scramble device 22 in the descrambling apparatus 16 and the descramble device 42 in the scrambling apparatus 12, but the invention shall not be so limited. When there is no reserved code used, the comparator 222 and switching device 32 can be eliminated with no adverse effect on operation.

In addition, this embodiment comprises a detector 221 in the scramble device 22 of the descrambling apparatus 16 and in the descramble device 42 of the scrambling apparatus 12, but the invention shall not be so limited. The detector 221 can be eliminated by using a fixed value or a value selected during use for the masking signal, in which case the change in the sound level will be held constant before and after scrambling, or the change can be controlled, and the circuit can be simplified. Reserved code management can, of course, be maintained in this case, too.

The comparison position is also determined by the masking signal input to the comparator 222 in this embodiment, but if the NMSB of the reserved code is the second highest bit as in 0x8000, determination of the comparison position shall not be so limited and the comparison position may be fixed to the two highest bits. Why this is possible is described below.

In a masking signal for sample data of which the two highest bits match the reserved code, all fourteen bits are set to '1'. The comparison by the comparator 222 therefore applies only to the highest two bits. For sample data of which the two highest bits do not match the reserved code, there will obviously be no match no matter how many bits are compared. Furthermore, because the encrypted bits are at most the low fourteen bits, this relationship can be maintained during the decrypting process, too. As a result, it is sufficient to only compare the two highest bits, and, in addition to the benefits described above, it is also possible to simplify the scrambling system.

The scramble device 22 of the embodiment above is also described using a 14-bit masking signal of which all bits lower than the NMSB are '1' and all other bits are '0', but shall not be so limited. It is also possible to randomize only the bits lower than the NMSB. As a result, the format of the masking signal may be any desired format, including a data format of which all bits lower than the NMSB are '0' and all other bits are '1', and a data format indicating the position of the NMSB.

In the first embodiment of the invention, when the reserved code matches the sample of the two highest bits and the '0' position of the masking signal, the process flag is set to '0', but is otherwise set to '1' The invention shall not be limited, however, and the process flag may be any information identifying whether there is a match or mismatch between the reserved code and the bit sample of the position indicated by the masking signal as unencrypted.

Because the encryption device 223 of the first embodiment described above may be any construction whereby the sample data of the position where the masking signal is '1' is randomized when the process flag is '1', a different embodiment of the encryption device 223 shown in FIG. 3 is described below.

Figure 8A:
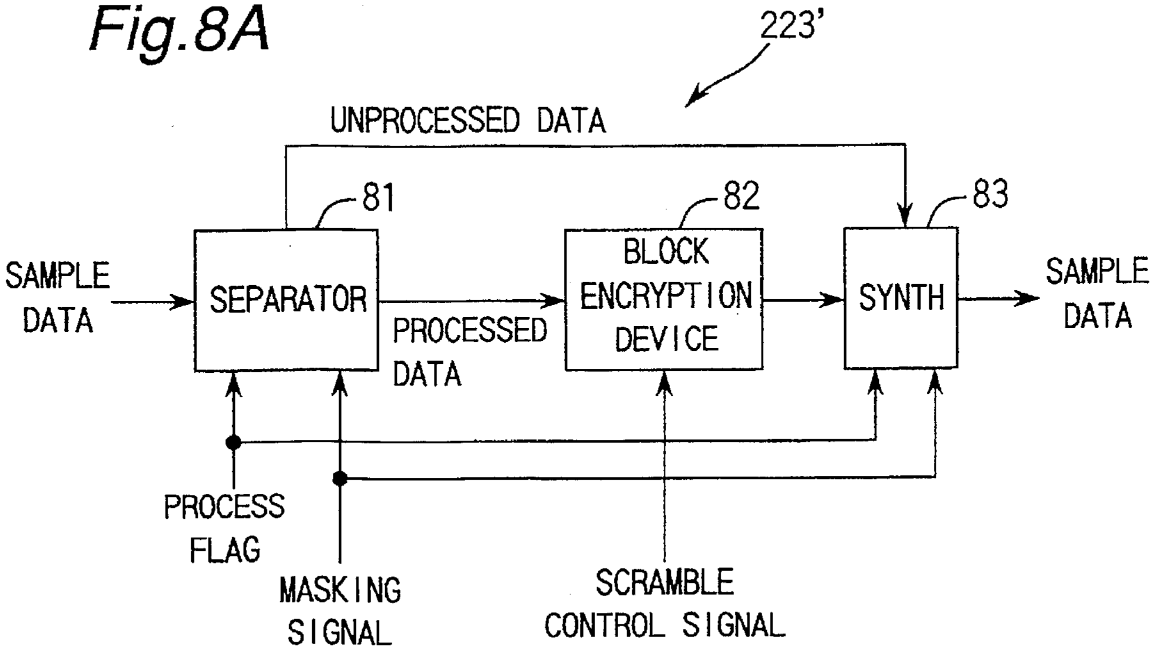
FIGS. 8A and 8B are block diagrams showing a modifications of the encryption device and the decryption device.

FIG. 8A is a block diagram of an encryption device 223' which is a modification of that shown in FIG. 3, and applies block encryption. As shown in FIG. 8A, this encryption device 223 comprises a separator 81, block encryption device 82, and synthesizer 83. The audio signal, process flag, and masking signal are input to the separator 81, which outputs as processed data the data of the position where the masking signal is '1' when the process flag of the sample data is '1', and outputs the remaining data as unprocessed data. The block encryption device 82 then encrypts and outputs the processed data. The synthesizer 83 then synthesizes the unprocessed data and the output from the block encryption device 82; this operation is controlled by inputting the process flag and the masking signal to the synthesizer 83 to inverse the operation of the separator 81.

Figure 8B:
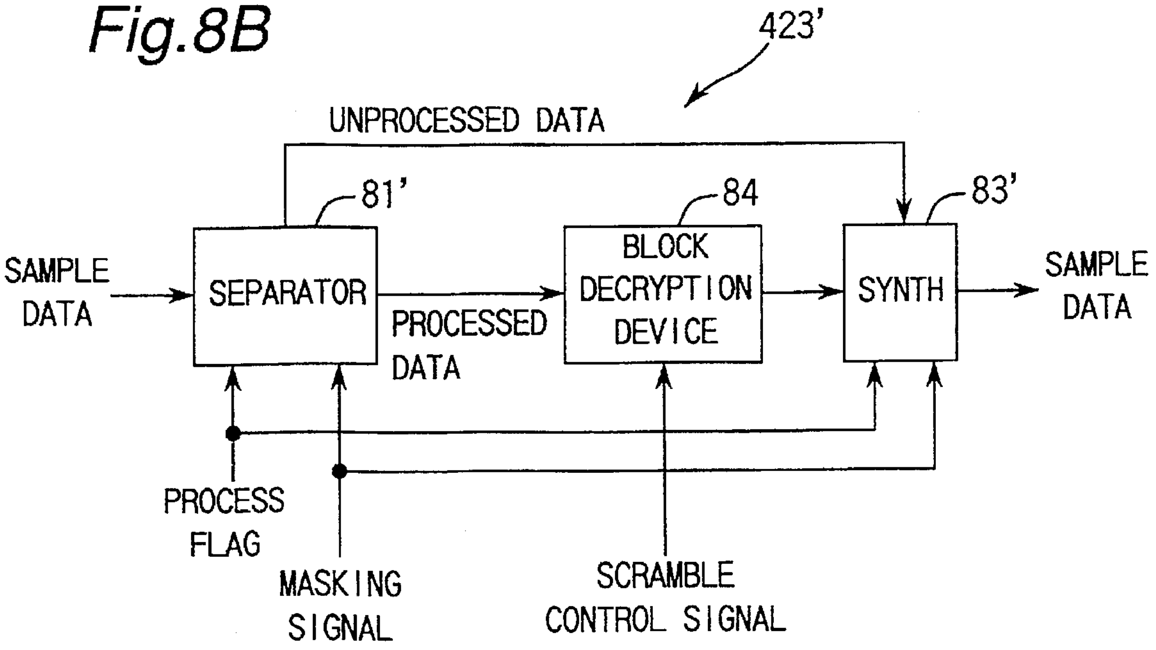

FIG. 8B is a block diagram of a decryption device 423' applying block encryption. As shown in FIG. 8B, this decryption device 423' comprises a separator 81', block decryption device 84, and synthesizer 83'. The operation of the separator 81' and synthesizer 83' are identical to those of the encryption device 223 described above, and is therefore omitted here. The block decryption device 84 essentially inverses the encryption process of the block encryption device 82.

The same benefits can be obtained by these encryption device 223' and decryption device 423' as described above. The scrambling apparatus 12 and descrambling apparatus 16 of the first embodiment above have been described as processing 16-bit sample data, but the invention shall not be limited. When processing n-bit sample data, it is sufficient to simply adapt the process applied in 16-bit units above to n-bits.

Furthermore, the scrambling system of the first embodiment above has been described as processing a digital audio signal of plural sample data units, but the invention shall not be limited and can be applied to any digital data signal of plural equal-bit-length code units. In such applications, reserved code management can still be maintained.

SECOND EMBODIMENT

Figure 9:
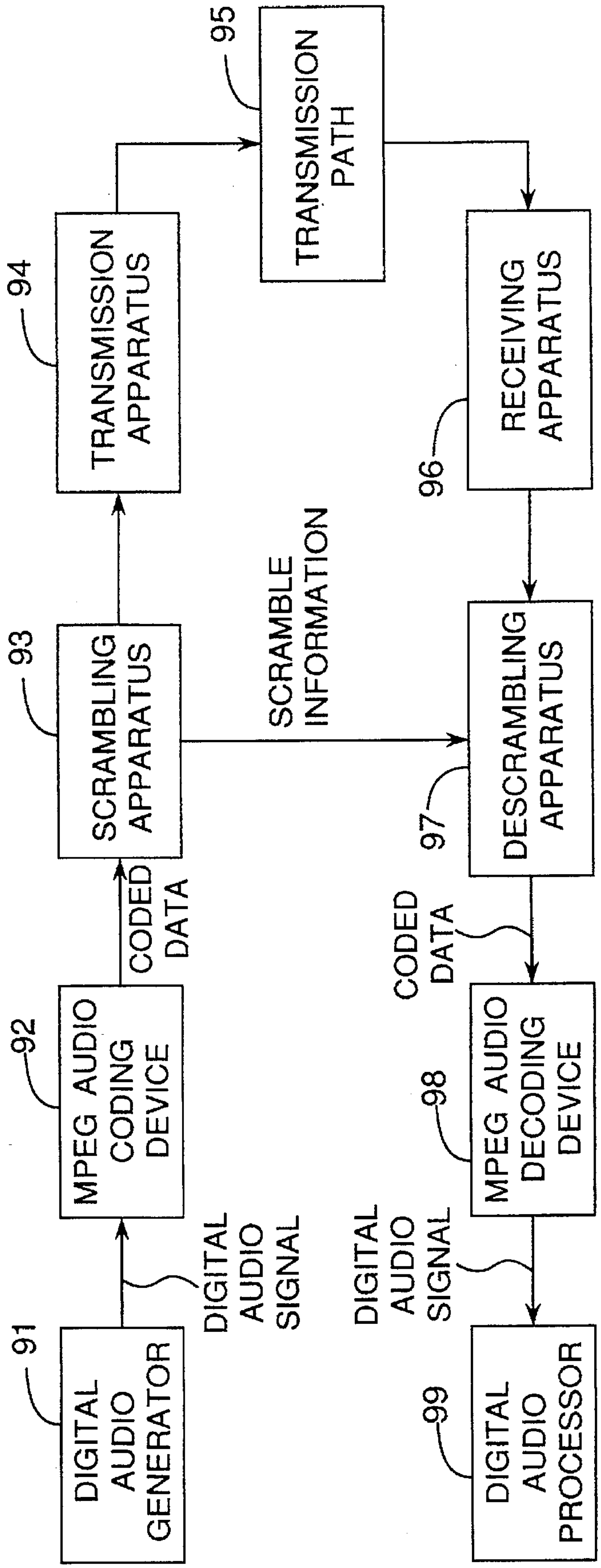
FIG. 9 is a block diagram of a scrambling system according to a second embodiment of the invention.

The second embodiment of an audio scrambling system according to the invention is described below with reference to the accompanying figures. Shown in FIG. 9 is a block diagram of the audio scrambling system according to the second embodiment, comprising a digital audio generator 91, MPEG audio coding device 92, scrambling apparatus 93, transmission apparatus 94, transmission path 95, receiving apparatus 96, descrambling apparatus 97, MPEG audio decoding device 98, and digital audio processor 99.

The operation of the scrambling system of this second embodiment is described below. The operation of the digital audio generator 91, transmission path 95, and digital audio processor 99 of this embodiment is identical to the operation of the digital audio generator 11, transmission path 14, and digital audio processor 18 of the first embodiment scrambling system above, and detailed description is omitted.

The MPEG audio coding device 92 applies coding to data compress the digital audio signal output from the digital audio generator 91, and outputs the result as the MPEG audio. MPEG audio and the operation of the MPEG audio coding device 92 are described in further detail below.

Next, the scrambling apparatus 93 scrambles the MPEG audio output from the MPEG audio coding device 92; the operation of this scrambling apparatus 93 is also described below.

The output from the scrambling apparatus 93 is then transmitted by the transmission apparatus 94 over the transmission path 95, and is received by the receiving apparatus 96. The descrambling apparatus 97 then descrambles the MPEG audio signal. This descrambling apparatus 97 essentially reverses the scrambling operation of the scrambling apparatus 93, and is described in further detail below.

The MPEG audio decoding device 98 then decodes the MPEG audio signal, and outputs the resulting digital audio signal.

MPEG audio is described first. MPEG (Moving Picture Expert Group) is the common name of ISO-IEC/JTC1/SC2/WG11, the working group for international standardization of high efficiency coding methods for digital moving picture and audio signals. The MPEG audio signal is one data type coded according to this standardized method; there are three different methods known as Layer I, Layer II, and Layer III. The MPEG audio standard is specifically detailed in MPEG CD 11172-3 ("Coding Of Moving Pictures And Associated Audio For Digital Storage Media At Up To About 1.5 Mbit/s," part 3, Audio), the entire content of which is expressly incorporated by reference herein.

The operation of an MPEG audio coding device generating a Layer I type MPEG audio signal is described briefly below.

First frame data comprising plural sample data is converted into frequency domain and divided into plural sub-bands. The highest amplitude in each sub-band is then determined, and the sample data of each sub-band is scaled with this maximum amplitude. The data of the scaled sub-bands is then quantized to produce the quantized sample data. The bit allocation data identifying the number of quantization bits used for this quantization operation, the scale factors identifying the maximum amplitude of each sub-band, and the quantized sample data of each sub-band are then synthesized to produce the MPEG audio signal. The MPEG audio signal also contains header information containing the coding method and other data.

In the actual coding of a Layer I MPEG audio signal, one frame contains 384 data samples (equivalent to 8 msec. at a 44.1-kHz sampling rate), and each frame is divided into 32 sub-bands. Each sub-band therefore contains twelve samples. The bit stream is generated by this bit allocation, scaling, and quantization process applied to all incoming data.

The format of the bit stream of one Layer I frame of the MPEG-1 standard audio signal is shown in Table 2.

TABLE 2

| Bit stream format for a Layer I MPEG-standard audio signal | |
|---|---|
| header | 32 bits |
| error_check | 16 bit of 0 bit |
| allocation [ch] [sb] | (1→2) * 4 bits * 32 |
| scale_factor [ch] [sb] | (1→2) * 6 bits * (32 max) |
| sample[ch] [sb] [s] | (1→2) * (0→15 bit) * (12 * 32 max) |
| ancillary_data | xbit |

(Note: → indicates "through".)

In Table 2, allocation [ch] [sb] is the bit allocation information, scale_factor [ch] [sb] is the scale factor, and sample [ch] [sb] [s] is the quantized sample data; 'ch' indicates the channel; 'sb' indicates the sub-band index, and is used to identify which sub-band the data corresponds to by appending a number to each sub-band; 's' is the sample index, and is used to identify which sample the data corresponds to by appending a number to each sample; '32 max' indicates that information is not transmitted when the bit allocation information (allocation [ch] [sb]) is '0'.

Figure 10:
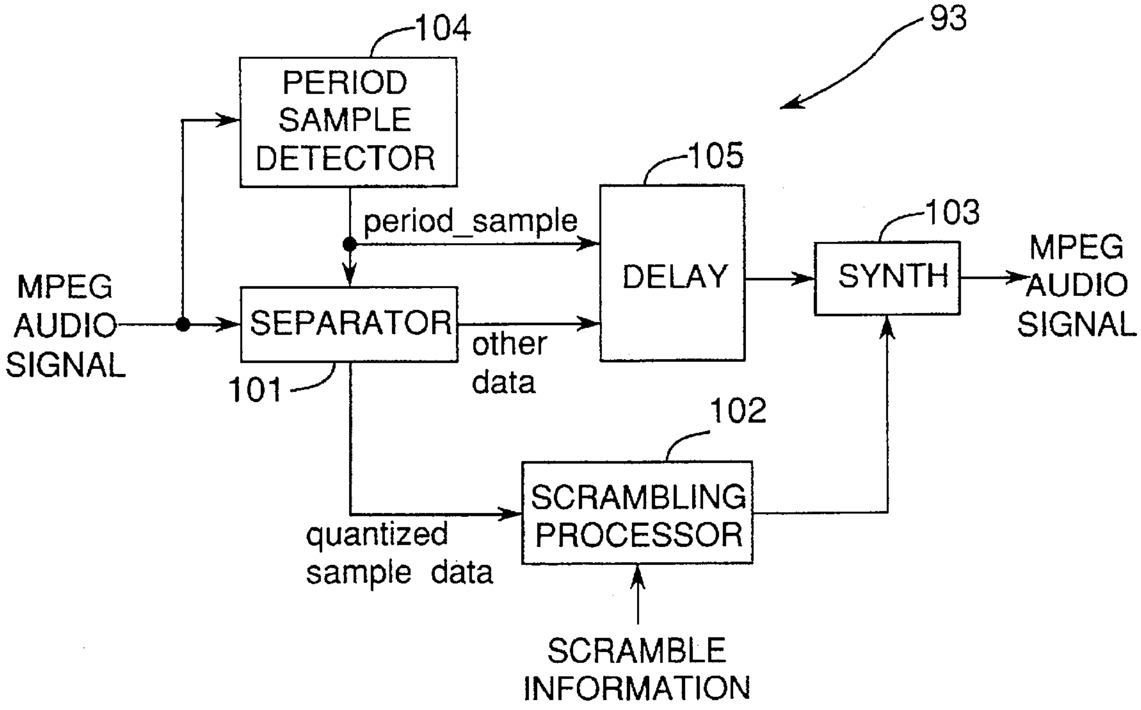
FIG. 10 is a block diagram showing a detail of a scrambling apparatus shown in FIG. 9.

FIG. 10 is a block diagram of the audio scrambling system according to the second embodiment of the invention. As shown in FIG. 10, this audio scrambling system comprises a separator 101, scrambling processor 102, synthesizer 103, period sample detector 104 and delay 105. The operation of this apparatus is described below.

Figure 13:
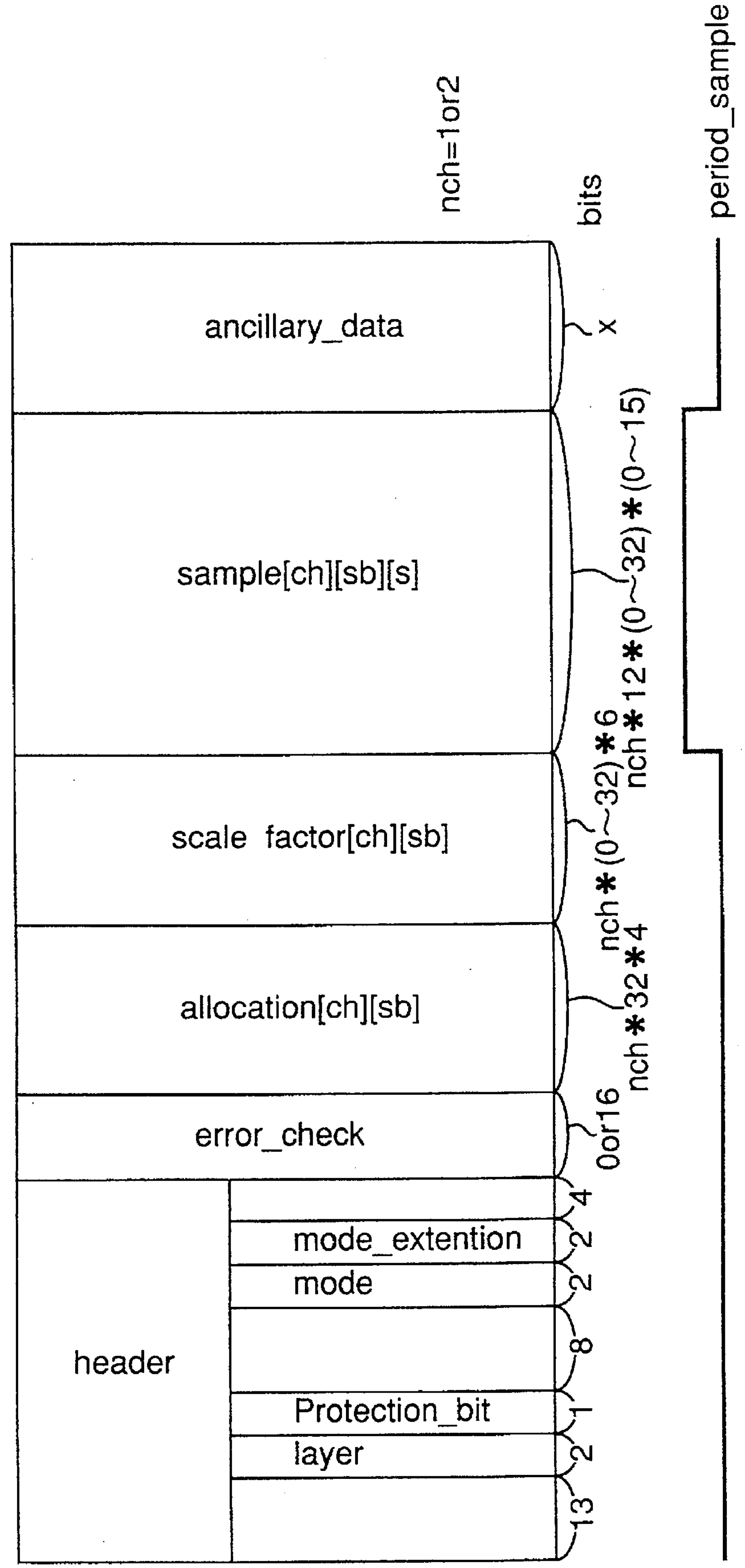
FIG. 13 is a diagram showing the bit stream of layer I of MPEG audio data together with a period sample pulse.

A Layer I MPEG audio signal is input to the separator 101 and also to the period sample detector 104. The period sample detector 104 detects a period_sample in which the quantized sample data exists, and produces a HIGH level signal during the detected period_sample, as shown in FIG. 13. The steps for detecting the period_sample will be described in detail later in connection with FIGS. 14–18. The separator 101 separates the input signal into the quantized sample data (sample [ch] [sb] [s]) and data other than the quantized sample data (header, error_check, allocation [ch] [sb], scale_factor [ch] [sb], ancillary_data) by the use of a period_sample pulse from period sample detector 104; and outputs the separated components.

The quantized sample data and the scramble information are input to the scrambling processor 102, which uses the scramble information to scramble the quantized sample data. Delay 105 is provided to delay the data other than the quantized sample data by a time period necessary for processing in the scrambling processor 102. Finally, the synthesizer 103 synthesizes the scrambled quantized sample data input thereto from the scrambling processor 102, and the data other than the quantized sample data input thereto from the delay 105 so that the quantized sample data is located in the same position as in the original signal, thereby generating the Layer I MPEG audio signal which is output therefrom.

As shown in FIG. 13, the bit stream of layer I of the MPEG audio portion has a header in which layer, protection_bit, mode and mode_extension are present. The bit stream of the MPEG audio layer I further has an error_check, allocation [ch] [sb], scale factor [ch] [sb], sample [ch] [sb] [s], and ancillary_data. Next, the steps for making the period_sample pulse, also shown in FIG. 13, will be described.

Figure 14:
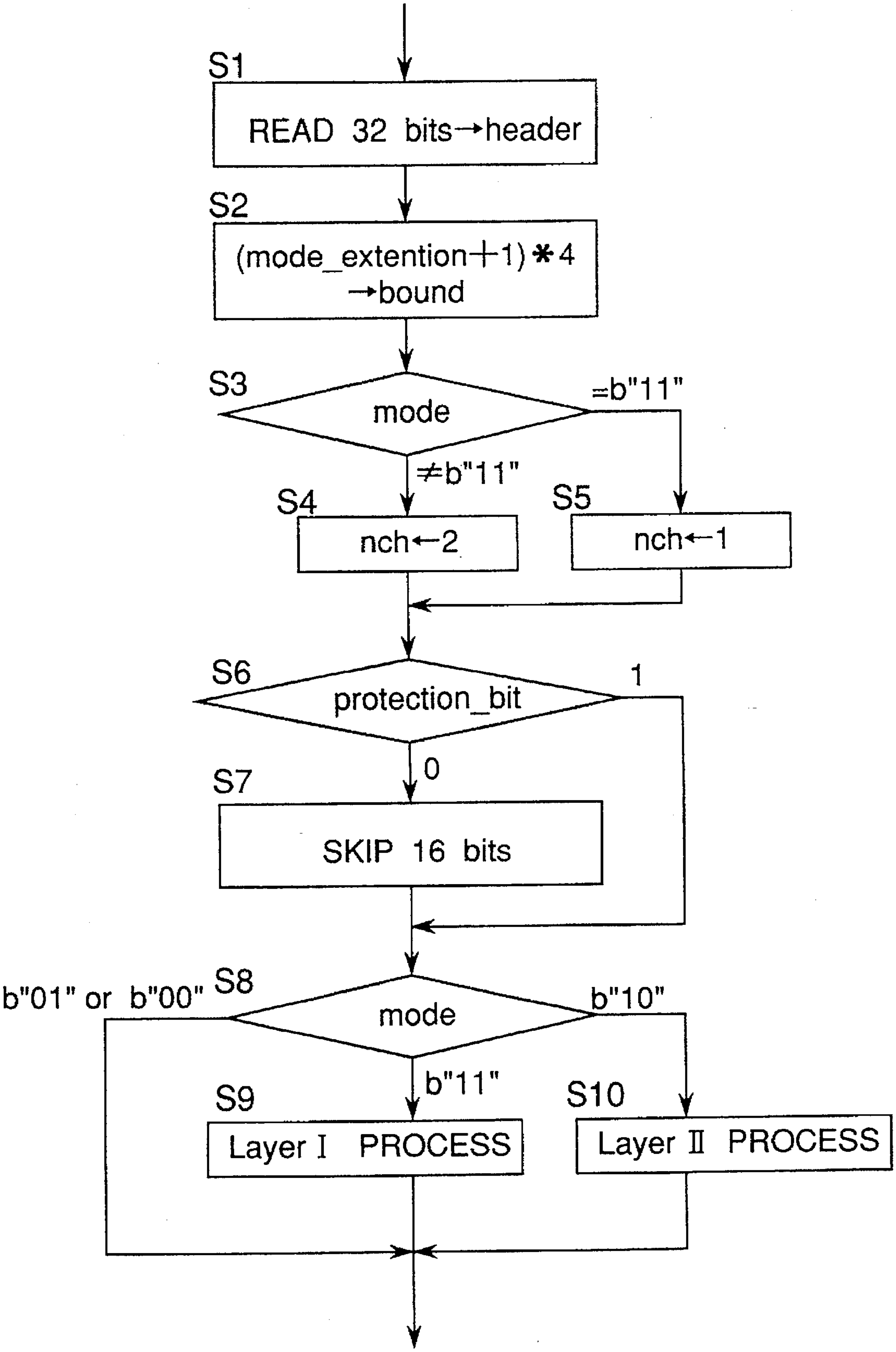
FIGS. 14, 15, 16, 17 and 18 show flow charts for extracting the $period_{13}$ sample pulse.

Referring to FIG. 14, the following steps are taken.

Step S1: 32 bits of header data is read and stored in "header".

Step S2: (mode_extension +1)*4 is stored in "bound".

Step S3: It is detected whether the data in the mode is equal to b'11' or not. (Here, b'**' represents a binary expression.)

Step S4: When the mode is not equal to b'11', 2 is stored in "nch".

Step S5: When the mode is equal to b'11', 1 is stored in "nch".

Step S6: It is detected whether the protection_bit is equal to 1 or 0.

Step S7: When the protection_bit is equal to 0, 16 in the data stream bits are skipped. When the protection_bit is equal to 1, no skipping is effected.

Step S8: It is detected whether the data in the layer is equal to b'00', b'01', b'10' or b'11'.

Step S9: Layer I process is carried out when the detected layer is equal to b'11'.

Step S10: Layer II process is carried out when the detected layer is equal to b'10'.

Figure 15:
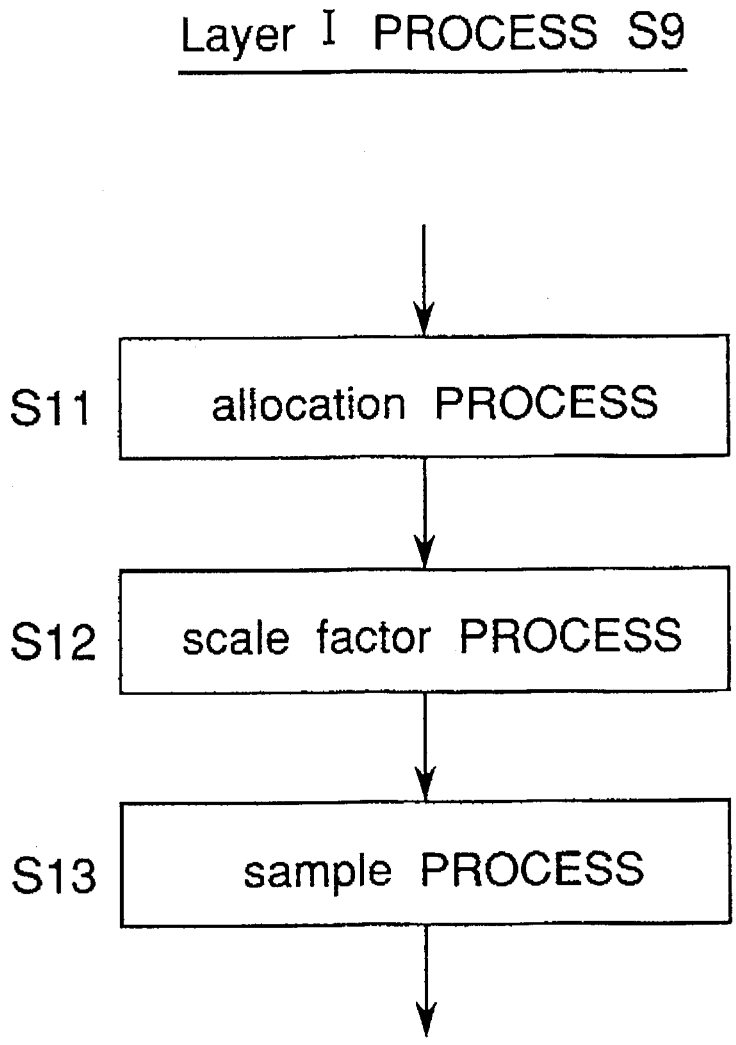

Referring to FIG. 15, the following steps are taken in the layer I process.

Step S11: Allocation process is carried out.

Step S12: Scale factor process is carried out.

Step S13: Sample process is carried out.

The description on the layer II process will be omitted, but it is noted that the period_sample is extracted between the sample_code and sample.

Figure 16:
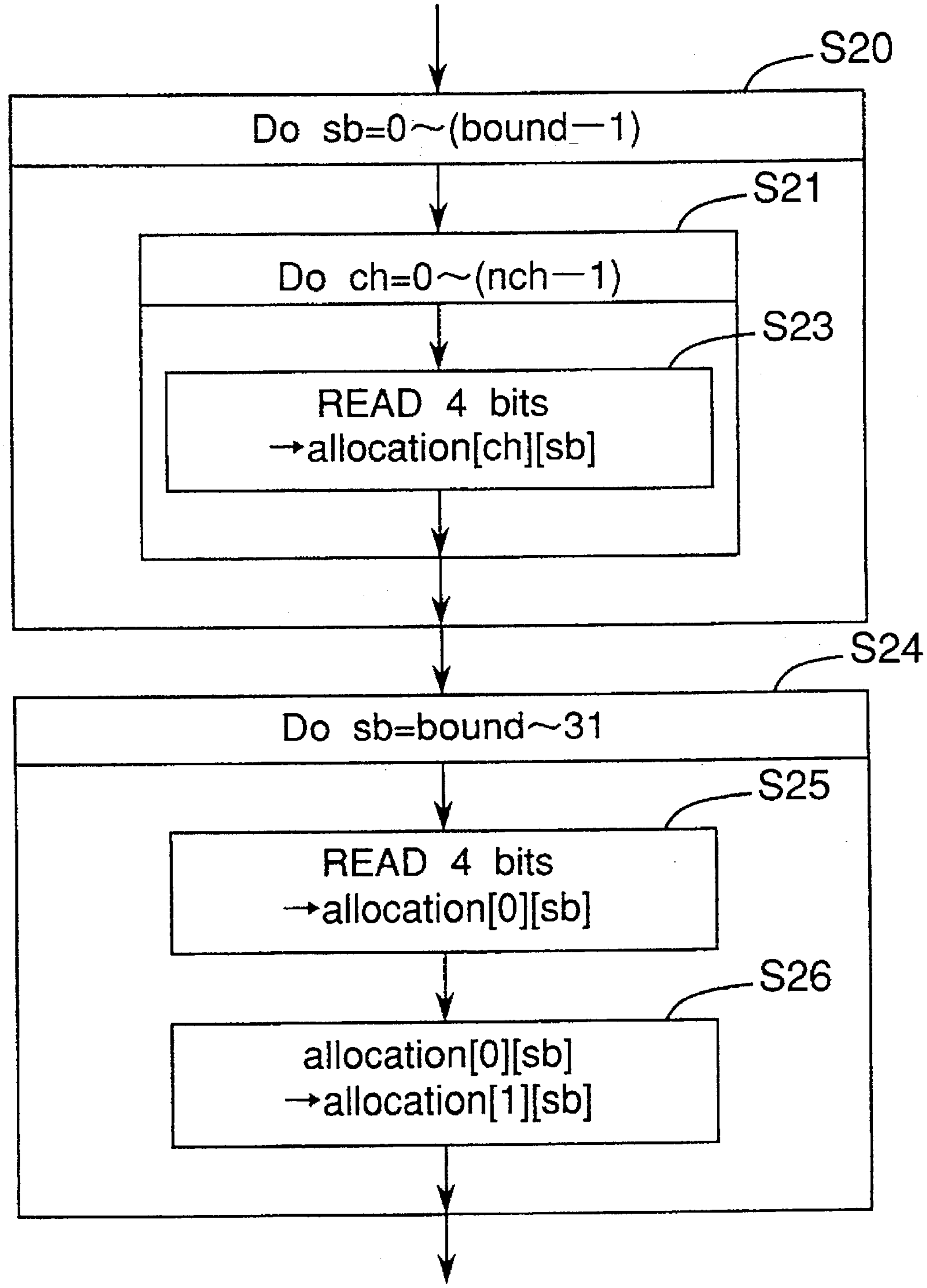

Referring to FIG. 16, the following steps are taken in the allocation process S11 to exactly skip the bit stream length equal to the allocation area.

Step S20: Allocation [ch] [sb] is repeated for a selected number of times determined by [sb] in which sb changes from 0 to ("bound"−1).

Step S21: Allocation [ch] [sb] is repeated for a selected number of times determined by [ch] in which ch changes from 0 to ("nch"−1) while [sb] is taking a certain value.

Step S23: Next four bits in the data stream is read and is moved to allocation [ch] [sb]. Thus, step S23 will be repeatedly carried out for "bound" x "nch" times.

Step S24: Allocation [sb] is repeatedly carried out for a selected number of times determined by [sb] in which sb changes from "bound" to 31.

Step S25: Next four bits in the data stream is read and is moved to allocation [0] [sb].

Step S26: The data in allocation [0] [sb] is copied to allocation [1] [sb].

Figure 17:
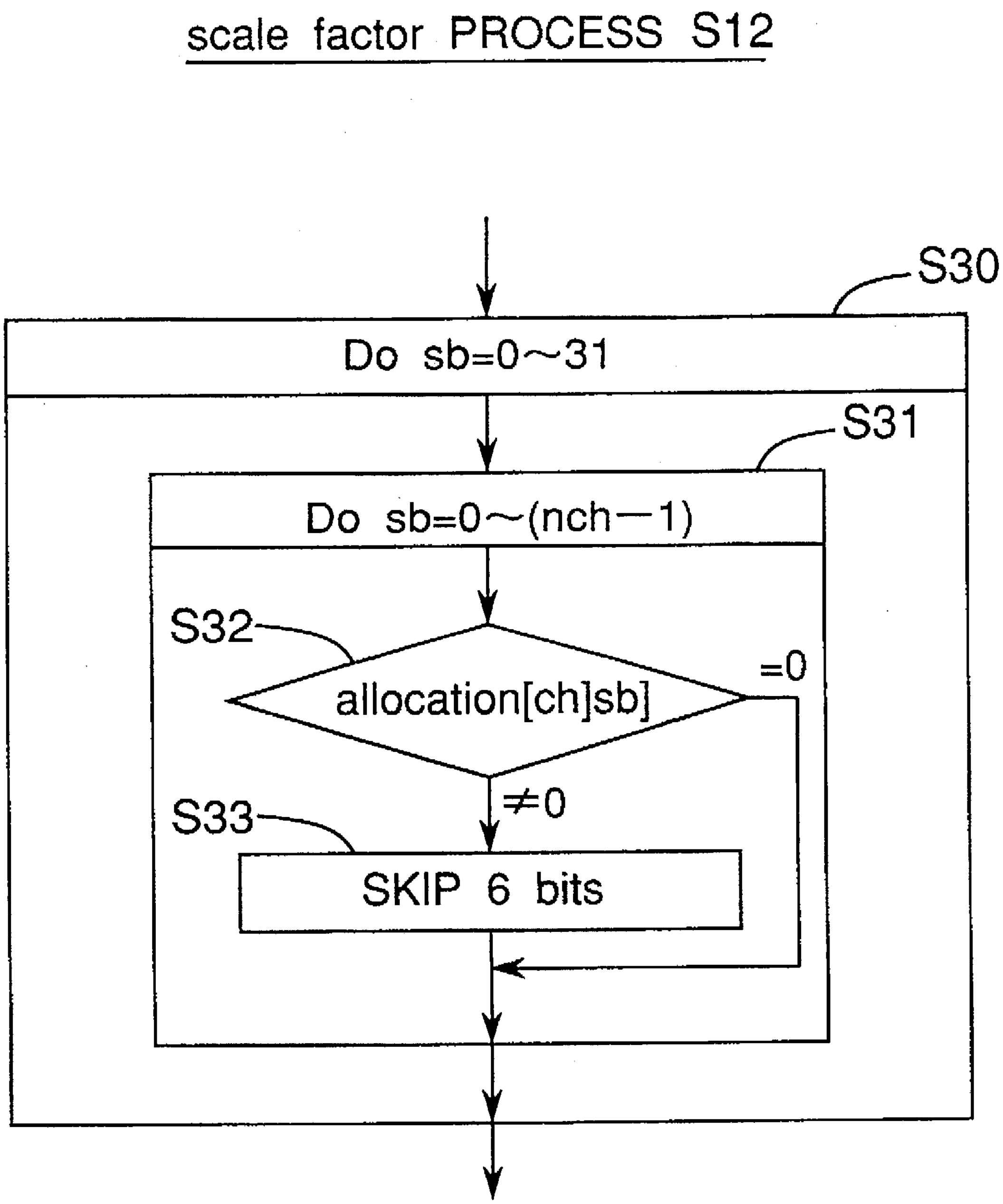

Referring to FIG. 17, the following steps are taken in the scale factor process S12 to exactly skip the bit stream length equal to the scale factor area.

Step S30: Scale factor [ch] [sb] is repeated for a selected number of times determined by [sb] in which sb changes from 0 to 31.

Step S31: Scale factor [ch] [sb] is repeated for a selected number of times determined by [ch] in which ch changes from 0 to ("nch"−1) while [sb] is taking a certain value.

Step S32: It is detected whether or not the allocation [ch] [sb] is equal to 0 or not.

Step S33: When the allocation [ch] [sb] is not equal to 0, six bits in the data stream are skipped.

Figure 18:
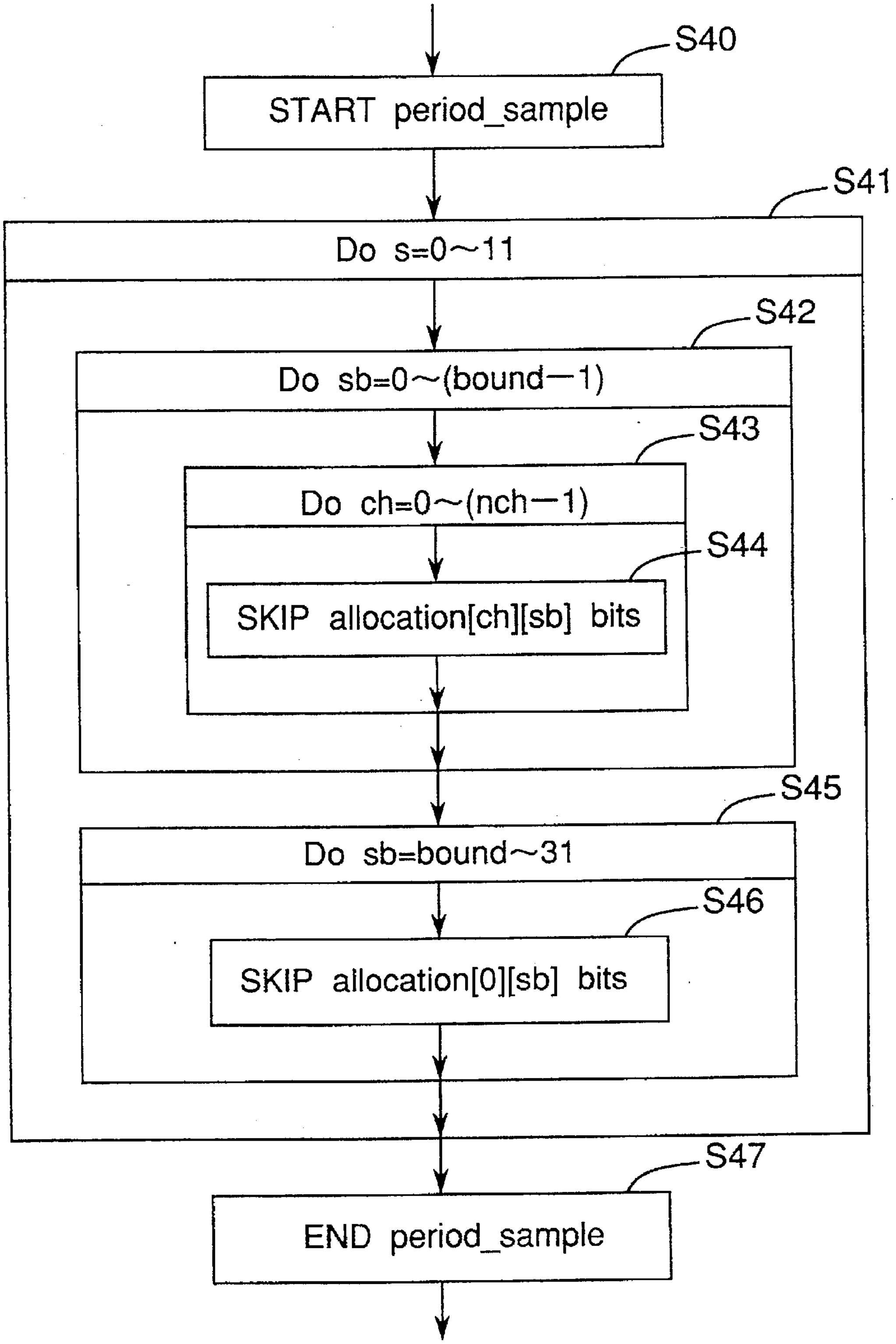

Referring to FIG. 18, the following steps are taken in the sample process S13 to generate the period_sample pulse.

Step S40: The leading edge of the period_sample pulse is defined.

Step S41: Sample [ch] [sb] [s] is repeated for a selected number of times determined by [s] in which s changes from 0 to 11.

Step S42: Sample [ch] [sb] [s] is repeated for a selected number of times determined by [sb] in which sb changes from 0 to ("bound"−1) while [s] is taking a certain value.

Step S43: Sample [ch] [sb] [s] is repeated for a selected number of times determined by [ch] in which ch changes from 0 to ("nch"−1) while [s] and [sb] are taking a certain value.

Step S44: Allocation [ch] [sb] bits in the data stream are skipped.

Step S45: Sample [ch] [sb] [s] is repeated for a selected number of times determined by [sb] in which sb changes from "bound" to 32.

Step S46: Allocation [0] [sb] bits are skipped.

Step S47: The trailing edge of the period_sample pulse is defined.

In summary, to obtain the position of the quantized sample data, it is first determined from the header that the MPEG audio signal is an MPEG-1 Layer I signal. Then, the error_check symbol is detected. The data size of scale factor [ch] [sb] and sample [ch] [sb] [s] is obtained from allocation [ch] [sb], and the position of the quantized sample data is obtained from this information. Note that the method of obtaining the position of the quantized sample data is not limited to the described method, and other methods may be used. For example, if the presence of the error_check data is not variable, it is not necessary to use the protection_bit in the header.

Figure 11:
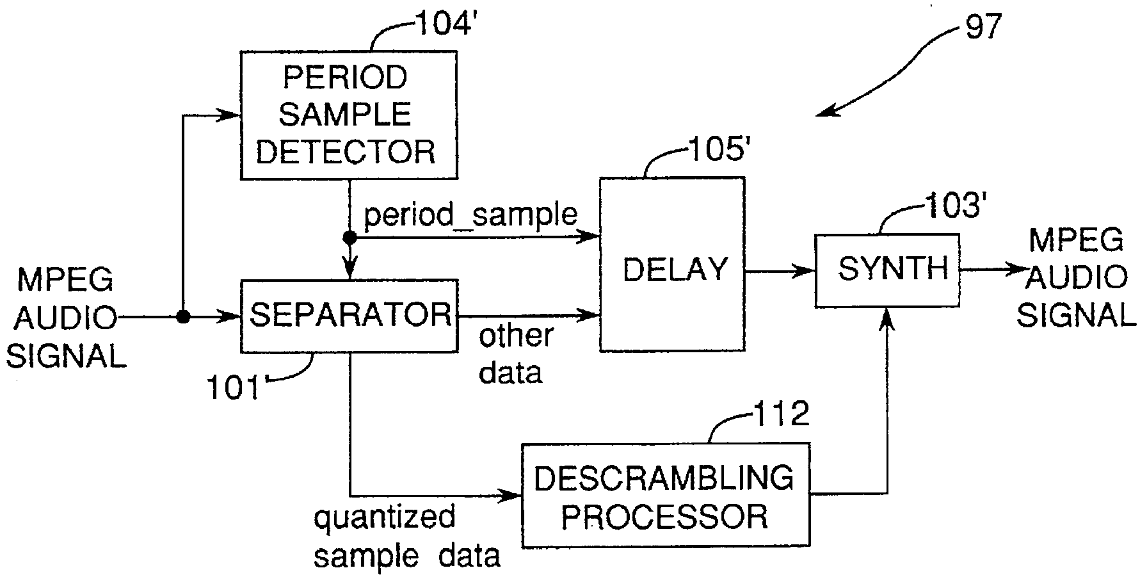
FIG. 11 is a block diagram showing a detail of a descrambling apparatus shown in FIG. 9.
Figure 12:
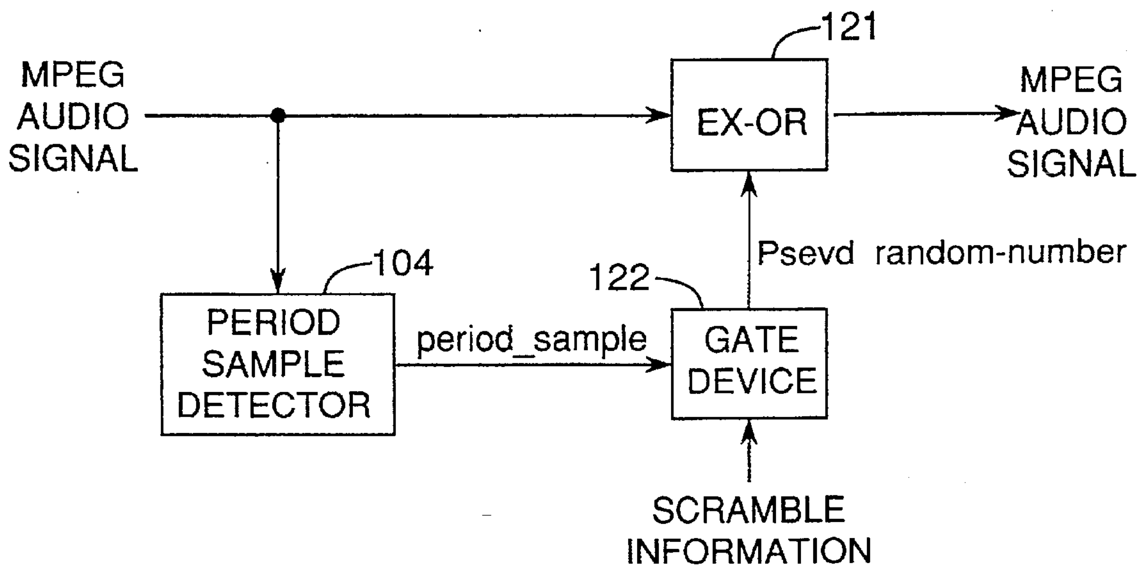
FIG. 12 is a block diagram showing a modification of the scrambling and descrambling apparatus of FIGS. 10 and 11.

FIG. 11 is a block diagram of the audio descrambling apparatus 97 according to the second embodiment of the invention. As shown in FIG. 11, the audio descrambling apparatus comprises a separator 101', period sample detector 104', descrambling processor 112, delay 105' and synthesizer 103' The operation of this apparatus is described below.

The audio descrambling apparatus 97 is designed for processing a Layer I MPEG audio signal scrambled by the scrambling apparatus 93 shown in FIG. 10. The operation of the separator 101', period sample detector 104', delay 105' and synthesizer 103' is identical to the operation of those shown in FIG. 10, and further detailed description thereof is omitted below.

The quantized sample data and the scramble information are input to the descrambling processor 112, which uses the scramble information to descramble the quantized sample data. The scramble information input to the descrambling processor 112 at this time is the same as the scramble information used to scramble the quantized sample data now being descrambled, and the descrambling operation of the descrambling processor 112 is the inverse of the scrambling operation of the scrambling processor 102.

It should be noted that the scrambling method of the scrambling processor 102 of the audio scrambling system of the second embodiment, and the inverse of this operation applied as the descrambling method of the descrambling processor 112 of the audio descrambling system of the second embodiment, are not specifically defined herein. This is because the same effect can be obtained irrespective of the scrambling and descrambling method used insofar as the information is scrambled using a suitable scrambling technique, e.g., a block encryption method using the scramble information as the key, or an exclusive-0R operation on a random number where the scramble information is the random number, and descrambled using a process that reverses the scrambling process.

Furthermore, the scrambling apparatus 102 and descrambling apparatus 112 are comprised to scramble or descramble only the quantized sample data using the separator 101 and synthesizer 103, but the invention shall not be so limited. If the scrambling apparatus is comprised to scramble only the quantized sample data and not scramble the other data, it may be comprised in various other ways, including using an encryption device for processing only that position identified by the detection data.

By the second embodiment thus comprised, only the quantized sample data (sample [ch] [sb] [s]) is scrambled, and the scale_factor is not changed by the scrambling process. As a result, the quantized sample data of each sub-band is randomized, but the maximum amplitude is retained when the data is decoded; an abnormal frequency component is therefore not produced, and the sub-band data does not become abnormally high. Moreover, the amplitude does not become abnormally high overall, and audio scrambling which does not create a sound that is excessively unpleasant to the ear can be achieved.

The descrambling apparatus 97 descrambles the scrambled sample by reversing the scrambling process, and can thereby correctly reproduce the MPEG audio data scrambled by the scrambling apparatus 93.

The audio scrambling system according to this second embodiment has been described with reference to a Layer I MPEG audio signal formatted as shown in Table 2, but the invention shall not be so limited and can be applied with a Layer II MPEG audio bit stream or other audio signal format comprising a header identifying the compression method and plural sub-band data units where each sub-band unit contains the bit allocation information, the scale factor, and a quantized sample data quantized with the number of bits identified by the bit allocation information after scaling by the scale factor.

A different process must be used in audio coding a Layer II MPEG audio signal so that the coding efficiency is greater than the coding efficiency in Layer I audio coding, and a bit stream with a different format is produced. This bit stream format is the same as the Layer I bit stream format, however, in that it contains a header identifying the compression method and plural sub-band data units, and each sub-band unit contains the bit allocation information, the scale factor, and a quantized sample data quantized with the number of bits identified by the bit allocation information after scaling by the scale factor.

Furthermore, any desired audio signal format comprising a scale factor and a quantized sample data scaled using this scale factor may be used, including: audio signals with no header information and a fixed coding method; and audio signals which contain no header information or bit allocation information, and in which the location of the quantized sample data is fixed in the bit stream. The same benefits can be obtained when such signals are processed insofar as the data separator is designed to separate the quantized sample data from the other data.

In the audio scrambling system of the second embodiment described above, the separator 101 separates all quantized sample data from the other data, and the scrambling processor 102 and descrambling processor 112 process all quantized sample data. However, the separator 101 may be alternatively designed to separate quantized sample data of specific sub-band data units and the other data, and the scrambling processor 102 and descrambling processor 112 may be designed to process only the quantized sample data of specific sub-band data units. If the system is designed to process only the quantized sample data of sub-band data not in at least the high frequency band, data security will not be greatly impaired because at least the middle frequencies, which define the greatest part of the audio data, are randomized by the scrambling operation of the scrambling processor 102, as shown in FIG. 19.

Figure 19:
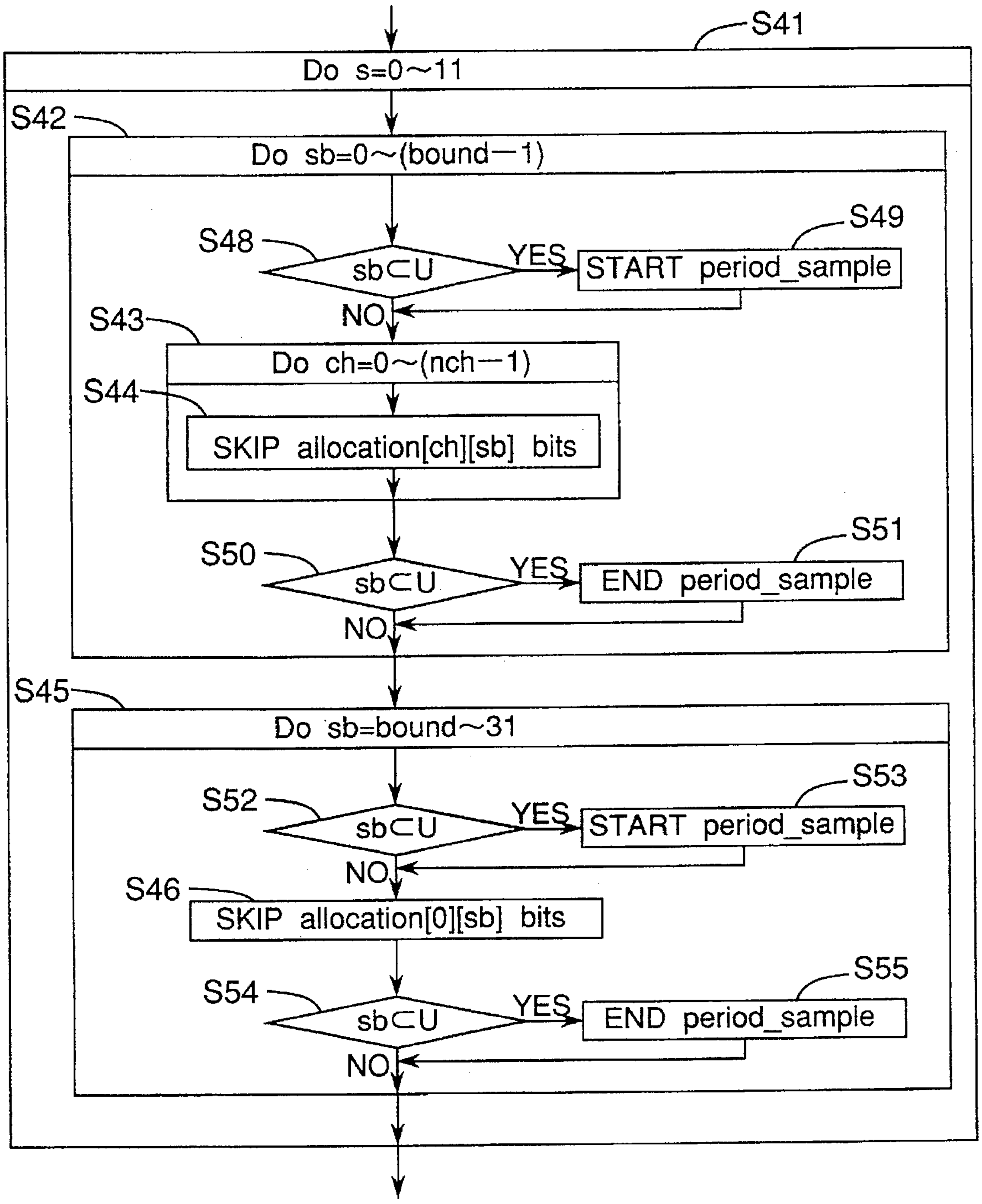
FIG. 19 is a flow chart showing a modification of FIG. 18.

Referring to FIG. 19, Step S48 detects whether or not the present sub-band number [sb] is contained in a previously selected group U. If yes, the leading edge of the period_sample pulse is defined at Step S49. If no, then no period_sample is defined. Then, at Step S50, again it is detected whether or not the present sub-band number [sb] is contained in the previously selected group U. If yes, the trailing edge of the period_sample pulse is defined Step S51, and if no, no period_sample is defined. The same operations are carried out at Steps S52, S53, S54 and S55. In this manner, the period_sample pulse is provided not to every sample data, but only to selected sample data that has the sub-band number [sb] contained in the previously selected group U.

As a result, a scrambling apparatus whereby the unpleasant auditory effects of the scrambled audio are further reduced can be provided because no noise is generated in the high frequency band, and the descrambling apparatus will still be able to correctly restore the audio scrambled by the scrambling apparatus.

It is also possible to control what sub-band data is processed by a control signal input from an external source. In this case, it is possible to control both the degree of auditory unpleasantness resulting from the scrambled signal, and the security of the signal.

It is noted that the flow chart shown in FIGS. 14–19 is applicable not only to the period sample detector 104 in the scrambling apparatus 93, but also to the period sample detector 104' in the descrambling apparatus 97.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scrambling system comprising a scrambling apparatus and a descrambling apparatus for scrambling and descrambling digital audio codes having a plurality of sub-band units, each sub-band unit comprising at least a scale factor and a quantized sample data quantized after scaling with the scale factor, said scrambling apparatus comprising:

first detection means for detecting a sample period during which said quantized sample data is present; and scrambling means for scrambling only said quantized sample data at said sample period; and said descrambling apparatus comprising:

second detection means for detecting a sample period during which said quantized sample data is present; and descrambling means for descrambling only said scrambled quantized sample data at said sample period.

2. A scrambling system according to claim 1, wherein said scrambling apparatus further comprising:

separator means for separating said quantized sample data and data other than said quantized sample data, said separated quantized sample data being scrambled in said scrambling means;

delay means for delaying said data other than said quantized sample data; and synthesize means for synthesizing said separated and scrambled quantized sample data and said delayed data.

3. A scrambling system according to clam 2, wherein said delay means delays said data other than said quantized data for a time period which is coincident with a processing time of said scrambling means for scrambling said separated quantized sample data.

4. A scrambling system according to claim 1, wherein said descrambling apparatus further comprising:

separator means for separating said quantized sample data and data other than said quantized sample data, said separated quantized sample data being descrambled in said descrambling means;

delay means for delaying said data other than said quantized sample data; and synthesize means for synthesizing said separated and descrambled quantized sample data and said delayed data.

5. A scrambling system according to claim 4, wherein said delay means delays said data other than said quantized data for a time period which is coincident with a processing time of said descrambling means for descrambling said separated quantized sample data.

6. A scrambling system according to claim 1, wherein said first detection means comprises pulse generating means for generating a first pulse for extracting said quantized sample data.

7. A scrambling system according to claim 6, wherein said first detection means further comprises selecting means for generating said first pulse with respect to preselected quantized sample data.

8. A scrambling system according to claim 1, wherein said second detection means comprises pulse generating means for generating a first pulse for extracting said quantized sample data.

9. A scrambling system according to claim 8, wherein said second detection means further comprises selecting means for generating said first pulse with respect to preselected quantized sample data.

10. In a scrambling system comprising a scrambling apparatus and a descrambling apparatus for scrambling and descrambling digital audio codes having a plurality of sub-band units, each sub-band unit comprising at least a scale factor and a quantized sample data quantized after scaling with the scale factor, said scrambling apparatus comprising:

detection means for detecting a sample period during which said quantized sample data is present; and scrambling means for scrambling only said quantized sample data at said sample period.

11. In a scrambling system according to claim 10, wherein said scrambling apparatus further comprises:

separator means for separating said quantized sample data and data other than said quantized sample data, said separated quantized sample data being scrambled in said scrambling means;

delay means for delaying said data other than said quantized sample data; and synthesize means for synthesizing said separated and scrambled quantized sample data and said delayed data.

12. In a scrambling system according to claim 11, wherein said delay means delays said data other than said quantized data for a time period which is coincident with a processing time of said scrambling means for scrambling said separated quantized sample data.

13. In a scrambling system comprising a scrambling only apparatus and a descrambling apparatus for scrambling and descrambling digital audio codes having a plurality of sub-band units, each sub-band unit comprising at least a scale factor and a quantized sample data quantized after scaling with the scale factor, said descrambling apparatus comprising:

detection means for detecting a sample period during which said quantized sample data is present; and descrambling means for descrambling only said scrambled quantized sample data at said sample period.

14. A scrambling system according to claim 13, wherein said descrambling apparatus further comprises:

separator means for separating said quantized sample data and data other than said quantized sample data, said separated quantized sample data being descrambled in said descrambling means;

delay means for delaying said data other than said quantized sample data; and synthesize means for synthesizing said separated and descrambled quantized sample data and said delayed data.

15. In a scrambling system according to claim 14, wherein said delay means delays said data other than said quantized data for a time period which is coincident with a processing time of said descrambling means for descrambling said separated quantized sample data.

* * * * *